US012713435B2

(12) United States Patent
Zheng et al.

(10) Patent No.: US 12,713,435 B2
(45) Date of Patent: Aug. 18, 2026

(54) DOWNLINK CONTROL INFORMATION COMMUNICATION METHOD, APPARATUS, AND SYSTEM

(71) Applicant: HUAWEI TECHNOLOGIES CO., LTD., Shenzhen (CN)

(72) Inventors: Juan Zheng, Beijing (CN); Chaojun Li, Beijing (CN); Yongqiang Fei, Shenzhen (CN); Hailong Hou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 517 days.

(21) Appl. No.: 18/045,444

(22) Filed: Oct. 10, 2022

(65) Prior Publication Data

US 2023/0079149 A1 Mar. 16, 2023

Related U.S. Application Data

(63) Continuation of application No. PCT/CN2021/085452, filed on Apr. 2, 2021.

(30) Foreign Application Priority Data

Apr. 10, 2020 (CN) ........................ 202010281143.X

(51) Int. Cl.
*H04W 72/23* (2023.01)

(52) U.S. Cl.
CPC .................................. *H04W 72/23* (2023.01)

(58) Field of Classification Search
CPC ............. H04W 72/23; H04W 52/0219; H04W 52/0229; H04W 52/0216; H04W 52/0212; Y02D 30/70
See application file for complete search history.

(56) References Cited

U.S. PATENT DOCUMENTS

2017/0127413 A1 5/2017 Guan et al.
2018/0310257 A1 10/2018 Papasakellariou
(Continued)

FOREIGN PATENT DOCUMENTS

CN 101594205 A 12/2009
CN 106301731 A 1/2017
(Continued)

OTHER PUBLICATIONS

Machine Translation of WO 2017117813 A1 (Year: 2017).*
(Continued)

*Primary Examiner* — Khaled M Kassim
*Assistant Examiner* — Noah James Sugden

(57) ABSTRACT

Embodiments of this application provide a communication method, apparatus, and system. The method includes: After determining first downlink control information DCI, a network device sends the first DCI to a terminal device. Further, the terminal device receives the first DCI from the network device, and receives downlink data from the network device or sends uplink data to the network device based on the first DCI. The first DCI is for uplink or downlink data scheduling, a bit quantity of the first DCI is fixed, the first DCI includes a first identifier, the first identifier indicates a format of the first DCI, and the format of the first DCI includes a first DCI format or a second DCI format.

20 Claims, 3 Drawing Sheets

(56) References Cited

U.S. PATENT DOCUMENTS

| | | | | |
|---|---|---|---|---|
| 2019/0363843 | A1 | 11/2019 | Gordaychik | |
| 2020/0145972 | A1 * | 5/2020 | Kwak | H04W 72/23 |
| 2020/0260424 | A1 * | 8/2020 | Guo | H04W 72/23 |
| 2021/0176012 | A1 * | 6/2021 | Xu | H04W 72/23 |
| 2022/0045893 | A1 * | 2/2022 | Yamada | H04L 1/1896 |
| 2022/0060992 | A1 * | 2/2022 | Xue | H04W 72/23 |
| 2022/0217581 | A1 * | 7/2022 | Mu | H04W 28/06 |
| 2024/0014971 | A1 * | 1/2024 | Zheng | H04L 5/0048 |

FOREIGN PATENT DOCUMENTS

| | | | | |
|---|---|---|---|---|
| CN | 107359967 | A | 11/2017 | |
| CN | 108882366 | A * | 11/2018 | H04L 5/0053 |
| CN | 109802755 | A | 5/2019 | |
| CN | 110034842 | A | 7/2019 | |
| CN | 110574332 | A | 12/2019 | |
| WO | WO-2017117813 | A1 * | 7/2017 | H04W 72/04 |
| WO | 2019096082 | A1 | 5/2019 | |

OTHER PUBLICATIONS

Ericsson, New SID on support of reduced capability NR devices. 3GPP TSG RAN Meeting #86, Sitges, Spain, Dec. 9-12, 2019, RP-193238, 5 pages.

NTT Docomo et al: "PDCCH enhancements for URLLC", 3GPP Draft; R1-1904957,Apr. 3, 2019, XP051707351, total 7 pages.

* cited by examiner

DOWNLINK CONTROL INFORMATION COMMUNICATION METHOD, APPARATUS, AND SYSTEM

CROSS-REFERENCE TO RELATED APPLICATIONS

This application is a continuation of International Application No. PCT/CN2021/085452, filed on Apr. 2, 2021, which claims priority to Chinese Patent Application No. 202010281143.X, filed on Apr. 10, 2020. The disclosures of the aforementioned applications are hereby incorporated by reference in their entireties.

TECHNICAL FIELD

This application relates to the field of communication technologies, and in particular, to a communication method, apparatus, and system.

BACKGROUND

A fifth generation (fifth generation, 5G) mobile communication technology is a global 5G standard for a brand-new air interface design implemented based on orthogonal frequency division multiplexing (orthogonal frequency division multiplexing, OFDM), and is also a very important foundation for a next generation cellular mobile technology. Services of the 5G mobile communication technology are diversified, including enhanced mobile broadband (enhanced Mobile Broadband, eMBB) services, ultra-reliable low-latency communication (ultra-reliable low-latency communication, URLLC) services, and massive machine-type communication (massive machine-type communication, mMTC) services. Generally, compared with eMBB terminal devices, mMTC terminal devices (which may also be referred to as machine-type terminal devices) require higher power consumption. In view of this, in the 3rd generation partnership project (3rd generation partnership project, 3GPP) new radio (new radio, NR) release 17 (release 17), research on NR reduced capability (NR reduced capability, NR REDCAP) terminal devices, used as one type of the mMTC terminal devices, are attracting more and more attention.

How to reduce power consumption of the NR REDCAP terminal device? Considering that currently, some power consumption is inevitably caused when a terminal device detects downlink control information (downlink control information, DCI) sent by a network device, power consumption of the NR REDCAP terminal devices may be reduced by reducing power consumption of detecting, by the NR REDCAP terminal device, the DCI sent by the network device. However, there is no related solution to reducing power consumption of detecting the DCI by the terminal device.

SUMMARY

Embodiments of this application provide a communication method, apparatus, and system, to reduce power consumption of detecting DCI by a terminal device.

To achieve the foregoing objective, the following technical solutions are used in embodiments of this application.

According to a first aspect, a communication method is provided. The method is applicable to a communication apparatus, and the communication apparatus is, for example, a terminal device. The method includes: receiving first downlink control information DCI from a network device, where the first DCI is for uplink or downlink data scheduling, a bit quantity of the first DCI is fixed, the first DCI includes a first identifier, the first identifier indicates a format of the first DCI, and the format of the first DCI includes a first DCI format or a second DCI format; and receiving downlink data from the network device or sending uplink data to the network device based on the first DCI. Based on this solution, because the bit quantity of the first DCI is fixed, and the first DCI has a plurality of DCI formats, which means that one DCI size (also referred to as a bit quantity of DCI) may be designed for DCI in a plurality of formats, this can reduce complexity of detecting the DCI by the terminal device, to reduce power consumption of the terminal device, and ensure diversity of data transmission, to improve scheduling flexibility.

According to a second aspect, a communication method is provided. The method is applicable to a communication apparatus, and the communication apparatus is, for example, a network device. The method includes: determining first downlink control information DCI, where the first DCI is for uplink or downlink data scheduling, a bit quantity of the first DCI is fixed, the first DCI includes a first identifier, the first identifier indicates a format of the first DCI, and the format of the first DCI includes a first DCI format or a second DCI format; and sending the first DCI to a terminal device. Based on this solution, because the bit quantity of the first DCI is fixed, and the first DCI has a plurality of DCI formats, which means that one DCI size (also referred to as a bit quantity of DCI) may be designed for DCI in a plurality of formats, this can reduce complexity of detecting the DCI by the terminal device, to reduce power consumption of the terminal device, and ensure diversity of data transmission, to improve scheduling flexibility.

With reference to the first aspect or the second aspect, in a possible implementation, an information bit quantity of at least one information field in an information field included in the first DCI in the second DCI format is configurable. For example, the quantity may be configured by using RRC signaling, so that scheduling flexibility can be improved.

With reference to the first aspect or the second aspect, in a possible implementation, a bit quantity of each information field included in the first DCI in the first DCI format is fixed.

With reference to the first aspect or the second aspect, in a possible implementation, that a bit quantity of the first DCI is fixed includes: a bit quantity of each information field included in the first DCI is fixed; the first DCI includes an information field associated with a radio resource control RRC signaling configuration, but a bit quantity corresponding to the first DCI is fixed; or a bit quantity corresponding to the first DCI is related to an initial access parameter. In other words, in each of the foregoing manners, it may be considered that the bit quantity of the first DCI is fixed.

With reference to the first aspect or the second aspect, in a possible implementation, the bit quantity of the first DCI is the same as a bit quantity of second DCI, and the second DCI is for scheduling common information transmission. In other words, it is considered that, before establishing a data transmission link with the network device, the terminal device detects common information (for example, system information broadcast by the network device) transmitted by the network device, to obtain basic configuration information of the network device. In addition, the common information transmitted by the network device may alternatively be implemented in a DCI scheduling manner. To be specific, the network device may indicate, by using DCI, control information for scheduling common information transmission, and the terminal device may determine, by detecting the DCI, the control information for scheduling common information transmission, and receive, based on the control information, the common information transmitted by the network device. Therefore, in this embodiment of this application, the bit quantity of the first DCI may be designed to be the same as the bit quantity of the second DCI for scheduling common information transmission, so that a quantity of pieces of DCI that is to be detected by the terminal device and with different DCI sizes can be further reduced, thereby reducing power consumption of the terminal device.

With reference to the first aspect or the second aspect, in a possible implementation, a terminal device corresponding to common information is a first-type terminal device, or the terminal device corresponding to the common information includes the first-type terminal device and a second-type terminal device, where a capability of the first-type terminal device is different from a capability of the second-type terminal device. For example, the capability of the first-type terminal device is weaker than the capability of the second-type terminal device. Based on this solution, when the terminal device corresponding to the common information can include the first-type terminal device and the second-type terminal device, it also means that the first-type terminal device and the second-type terminal device may receive same common information, so that second DCI that is received by the first-type terminal device and that is for scheduling common information transmission is the same as second DCI that is received by the second-type terminal device and that is for scheduling common information transmission. From a perspective of a network device side, in this design, same DCI may be sent to different types of terminal devices to indicate common information transmission, and this may reduce overheads of sending the common information by the network device (where the overheads of the common information include resource overheads corresponding to DCI for scheduling common information transmission, or the overheads of the common information include resource overheads corresponding to DCI for scheduling common information transmission and common information transmission), to reduce power consumption on the network device side.

With reference to the first aspect or the second aspect, in a possible implementation, when the common information is system information, the second DCI includes control information for scheduling a system information block type 1 or other system information, and the second DCI is scrambled by a system information radio network temporary identifier SI-RNTI; the common information is a paging message, and the second DCI is scrambled by a paging radio network temporary identifier P-RNTI; or the common information is random access response RAR information, and the second DCI is scrambled by a random access radio network temporary identifier RA-RNTI. In other words, in this embodiment of this application, different common information may be distinguished by different RNTIs.

With reference to the first aspect or the second aspect, in a possible implementation, that the bit quantity of the first DCI is the same as a bit quantity of second DCI includes: a sum of bit quantities of all information fields included in the first DCI is the same as a sum of bit quantities of all information fields included in the second DCI; a bit quantity of original information of the first DCI is the same as a bit quantity of original information of the second DCI, where the bit quantity of the original information is a bit quantity of to-be-transmitted DCI on which a cyclic redundancy check CRC operation has not been performed; a bit quantity of the first DCI on which a channel coding operation has not been performed is the same as a bit quantity of the second DCI on which the channel coding operation has not been performed; a quantity of modulated symbols corresponding to transmission of the first DCI is the same as a quantity of modulated symbols corresponding to transmission of the second DCI; or a bit quantity corresponding to a modulated symbol that corresponds to transmission of the first DCI and that has been demodulated is the same as a bit quantity corresponding to a modulated symbol that corresponds to transmission of the second DCI and that has been demodulated. In other words, in each of the foregoing manners, it may be considered that the bit quantity of the first DCI is the same as the bit quantity of the second DCI.

With reference to the first aspect or the second aspect, in a possible implementation, the first DCI in the first DCI format includes one or more of the following information fields: a first information field, where the first information field indicates frequency domain resource allocation information; a second information field, where the second information field indicates time domain resource allocation information; a third information field, where the third information field indicates a modulation and coding scheme MCS; a fourth information field, where the fourth information field indicates a redundancy version RV indicator; or a fifth information field, where the fifth information field indicates a hybrid automatic repeat request HARQ process number.

With reference to the first aspect or the second aspect, in a possible implementation, when the first DCI is for downlink data scheduling, the first DCI in the first DCI format further includes one or more of the following information fields: a sixth information field, where the sixth information field indicates transmit power control TPC information for scheduling a physical uplink control channel PUCCH; a seventh information field, where the seventh information field indicates a PUCCH resource; or an eighth information field, where the eighth information field indicates a timing relationship between downlink data transmission scheduled by using the first DCI and a HARQ feedback.

With reference to the first aspect or the second aspect, in a possible implementation, when the first DCI is for uplink data scheduling, the first DCI in the first DCI format further includes a ninth information field, where the ninth information field indicates transmit power control TPC information for scheduling a physical uplink shared channel PUSCH.

With reference to the first aspect or the second aspect, in a possible implementation, the first DCI in the second DCI format includes an information field for a first data transmission function and an information field for a second data transmission function, where the first data transmission function indicates a basic function for scheduling data transmission, and the second data transmission function indicates an additional function for scheduling data transmission. The second data transmission function may be used to enable the first DCI in the second DCI format to be designed more flexibly, to improve scheduling flexibility.

With reference to the first aspect or the second aspect, in a possible implementation, the information field for the first data transmission function includes one or more of the following information fields: a first information field, where the first information field indicates frequency domain resource allocation information; a second information field, where the second information field indicates time domain resource allocation information; a third information field, where the third information field indicates a modulation and coding scheme MCS; a fourth information field, where the fourth information field indicates a redundancy version RV indicator; or a fifth information field, where the fifth information field indicates a HARQ process number.

With reference to the first aspect or the second aspect, in a possible implementation, when the first DCI is for downlink data scheduling, the information field for the first data transmission function further includes one or more of the following information fields: a sixth information field, where the sixth information field indicates transmit power control TPC information for scheduling a physical uplink control channel PUCCH; a seventh information field, where the seventh information field indicates a PUCCH resource; or an eighth information field, where the eighth information field indicates a timing relationship between downlink data transmission scheduled by using the first DCI and a HARQ feedback.

With reference to the first aspect or the second aspect, in a possible implementation, when the first DCI is for uplink data scheduling, the information field for the first data transmission function further includes a ninth information field, where the ninth information field indicates transmit power control TPC information for scheduling a PUSCH.

With reference to the first aspect or the second aspect, in a possible implementation, the information field for the second data transmission function includes one or more of the following information fields: a tenth information field, where the tenth information field indicates control information related to multi-antenna data transmission; an eleventh information field, where the eleventh information field indicates control information related to a code block group CBG; a twelfth information field, where the twelfth information field indicates beam-related control information; a thirteenth information field, where the thirteenth information field indicates carrier-related control information; or a fourteenth information field, where the fourteenth information field indicates control information related to bandwidth part BWP switching.

With reference to the first aspect or the second aspect, in a possible implementation, whether the information field for the second data transmission function is valid is indicated by using a control field in the first DCI in the second DCI format in a bitmap or binary manner, where parameter information corresponding to a valid information field is configured by using RRC signaling. In this embodiment of this application, for the first DCI in the second DCI format, when a specific configuration parameter of the information field is implemented through RRC configuration, RRC configuration signaling may be carried on a PDSCH scheduled by using the first DCI in the first DCI format. Because the bit quantity of the information field corresponding to the first DCI in the first DCI format is determined, the terminal device may determine, by detecting the first DCI format, scheduling information indicated by the first DCI, and further receive the PDSCH to obtain the RRC configuration signaling. When the terminal device detects the first DCI in the first DCI format, there is no problem of ambiguity in RRC signaling configuration.

With reference to the first aspect or the second aspect, in a possible implementation, only a DCI format with the bit quantity of the first DCI is configured in a user search space USS corresponding to the terminal device. Because only the DCI format with the bit quantity of the first DCI is configured in the USS, the terminal device needs to detect a DCI format of only one DCI size in the USS. Compared with the conventional technology in which the terminal device detects DCI formats of a maximum of two DCI sizes in the USS, in this solution, complexity of detecting DCI by the terminal device may be reduced, and power consumption of the terminal device may be further reduced.

With reference to the first aspect or the second aspect, in a possible implementation, only a DCI format with the bit quantity of the first DCI is configured in a USS corresponding to the terminal device and a common search space CSS. For the terminal device, when only the DCI format with the bit quantity of first DCI is configured in all configured USSs and all configured CSSs, the terminal device needs to detect a DCI format of only one DCI size at most. Compared with the conventional technology in which the terminal device detects DCI formats of a maximum of four DCI sizes in the CSS and the USS, in this solution, complexity of detecting DCI by the terminal device may be reduced, and power consumption of the terminal device may be further reduced.

According to a third aspect, a communication apparatus is provided. The communication apparatus includes a module, unit, or means (means) configured to perform the method described in any one of the first aspect or the possible implementations of the first aspect. The module, unit, or means may be implemented by hardware or software, or implemented by hardware executing corresponding software. The hardware or the software includes one or more modules or units corresponding to the foregoing functions. For example, the communication apparatus may be a terminal device, or may be a chip or another component disposed in the terminal device. The communication apparatus may include, for example, a transceiver module.

When the communication apparatus is configured to perform the method described in any one of the first aspect or the possible implementations of the first aspect, the transceiver module is configured to receive first downlink control information DCI from a network device, where the first DCI is for uplink or downlink data scheduling, a bit quantity of the first DCI is fixed, the first DCI includes a first identifier, the first identifier indicates a format of the first DCI, and the format of the first DCI includes a first DCI format or a second DCI format; and the transceiver module is further configured to receive downlink data from the network device or send uplink data to the network device based on the first DCI.

According to a fourth aspect, a communication apparatus is provided. The communication apparatus includes a module, unit, or means (means) configured to perform the method described in any one of the first aspect or the possible implementations of the first aspect. The module, unit, or means may be implemented by hardware or software, or implemented by hardware executing corresponding software. The hardware or the software includes one or more modules or units corresponding to the foregoing functions. For example, the communication apparatus may be a terminal device, or may be a chip or another component disposed in the terminal device. The communication apparatus may include, for example, a transceiver.

When the communication apparatus is configured to perform the method described in any one of the first aspect or the possible implementations of the first aspect, the transceiver is configured to receive first downlink control information DCI from a network device, where the first DCI is for uplink or downlink data scheduling, a bit quantity of the first DCI is fixed, the first DCI includes a first identifier, the first identifier indicates a format of the first DCI, and the format of the first DCI includes a first DCI format or a second DCI format; and the transceiver is further configured to receive downlink data from the network device or send uplink data to the network device based on the first DCI.

With reference to the third aspect or the fourth aspect, in a possible implementation, an information bit quantity of at least one information field in an information field included in the first DCI in the second DCI format is configurable.

With reference to the third aspect or the fourth aspect, in a possible implementation, a bit quantity of each information field included in the first DCI in the first DCI format is fixed.

With reference to the third aspect or the fourth aspect, in a possible implementation, that a bit quantity of the first DCI is fixed includes: a bit quantity of each information field included in the first DCI is fixed; the first DCI includes an information field associated with a radio resource control RRC signaling configuration, but a bit quantity corresponding to the first DCI is fixed; or a bit quantity corresponding to the first DCI is related to an initial access parameter.

With reference to the third aspect or the fourth aspect, in a possible implementation, the bit quantity of the first DCI is the same as a bit quantity of second DCI, and the second DCI is for scheduling common information transmission.

With reference to the third aspect or the fourth aspect, in a possible implementation, a communication apparatus corresponding to common information is a first-type communication apparatus, or the communication apparatus corresponding to the common information includes the first-type communication apparatus and a second-type communication apparatus, where a capability of the first-type communication apparatus is different from a capability of the second-type communication apparatus. For example, the capability of the first-type communication apparatus is weaker than the capability of the second-type communication apparatus.

With reference to the third aspect or the fourth aspect, in a possible implementation, when the common information is system information, the second DCI includes control information for scheduling a system information block type 1 or other system information, and the second DCI is scrambled by a system information radio network temporary identifier SI-RNTI; the common information is a paging message, and the second DCI is scrambled by a paging radio network temporary identifier P-RNTI; or the common information is random access response RAR information, and the second DCI is scrambled by a random access radio network temporary identifier RA-RNTI.

With reference to the third aspect or the fourth aspect, in a possible implementation, that the bit quantity of the first DCI is the same as a bit quantity of second DCI includes: a sum of bit quantities of all information fields included in the first DCI is the same as a sum of bit quantities of all information fields included in the second DCI; a bit quantity of original information of the first DCI is the same as a bit quantity of original information of the second DCI, where the bit quantity of the original information is a bit quantity of to-be-transmitted DCI on which a cyclic redundancy check CRC operation has not been performed; a bit quantity of the first DCI on which a channel coding operation has not been performed is the same as a bit quantity of the second DCI on which the channel coding operation has not been performed; a quantity of modulated symbols corresponding to transmission of the first DCI is the same as a quantity of modulated symbols corresponding to transmission of the second DCI; or a bit quantity corresponding to a modulated symbol that corresponds to transmission of the first DCI and that has been demodulated is the same as a bit quantity corresponding to a modulated symbol that corresponds to transmission of the second DCI and that has been demodulated.

With reference to the third aspect or the fourth aspect, in a possible implementation, the first DCI in the first DCI format includes one or more of the following information fields: a first information field, where the first information field indicates frequency domain resource allocation information; a second information field, where the second information field indicates time domain resource allocation information; a third information field, where the third information field indicates a modulation and coding scheme MCS; a fourth information field, where the fourth information field indicates a redundancy version RV indicator; or a fifth information field, where the fifth information field indicates a hybrid automatic repeat request HARQ process number.

With reference to the third aspect or the fourth aspect, in a possible implementation, when the first DCI is for downlink data scheduling, the first DCI in the first DCI format further includes one or more of the following information fields: a sixth information field, where the sixth information field indicates transmit power control TPC information for scheduling a physical uplink control channel PUCCH; a seventh information field, where the seventh information field indicates a PUCCH resource; or an eighth information field, where the eighth information field indicates a timing relationship between downlink data transmission scheduled by using the first DCI and a HARQ feedback.

With reference to the third aspect or the fourth aspect, in a possible implementation, when the first DCI is for uplink data scheduling, the first DCI in the first DCI format further includes a ninth information field, where the ninth information field indicates transmit power control TPC information for scheduling a physical uplink shared channel PUSCH.

With reference to the third aspect or the fourth aspect, in a possible implementation, the first DCI in the second DCI format includes an information field for a first data transmission function and an information field for a second data transmission function, where the first data transmission function indicates a basic function for scheduling data transmission, and the second data transmission function indicates an additional function for scheduling data transmission.

With reference to the third aspect or the fourth aspect, in a possible implementation, the information field for the first data transmission function includes one or more of the following information fields: a first information field, where the first information field indicates frequency domain resource allocation information; a second information field, where the second information field indicates time domain resource allocation information; a third information field, where the third information field indicates a modulation and coding scheme MCS; a fourth information field, where the fourth information field indicates a redundancy version RV indicator; or a fifth information field, where the fifth information field indicates a HARQ process number.

With reference to the third aspect or the fourth aspect, in a possible implementation, when the first DCI is for downlink data scheduling, the information field for the first data transmission function further includes one or more of the following information fields: a sixth information field, where the sixth information field indicates transmit power control TPC information for scheduling a physical uplink control channel PUCCH; a seventh information field, where the seventh information field indicates a PUCCH resource; or an eighth information field, where the eighth information field indicates a timing relationship between downlink data transmission scheduled by using the first DCI and a HARQ feedback.

With reference to the third aspect or the fourth aspect, in a possible implementation, when the first DCI is for uplink data scheduling, the information field for the first data transmission function further includes a ninth information field, where the ninth information field indicates transmit power control TPC information for scheduling a PUSCH.

With reference to the third aspect or the fourth aspect, in a possible implementation, the information field for the second data transmission function includes one or more of the following information fields: a tenth information field, where the tenth information field indicates control information related to multi-antenna data transmission; an eleventh information field, where the eleventh information field indicates control information related to a code block group CBG; a twelfth information field, where the twelfth information field indicates beam-related control information; a thirteenth information field, where the thirteenth information field indicates carrier-related control information; or a fourteenth information field, where the fourteenth information field indicates control information related to bandwidth part BWP switching.

With reference to the third aspect or the fourth aspect, in a possible implementation, whether the information field for the second data transmission function is valid is indicated by using a control field in the first DCI in the second DCI format in a bitmap or binary manner, where parameter information corresponding to a valid information field is configured by using RRC signaling.

With reference to the third aspect or the fourth aspect, in a possible implementation, only a DCI format with the bit quantity of the first DCI is configured in a user search space USS corresponding to the communication apparatus.

With reference to the third aspect or the fourth aspect, in a possible implementation, only a DCI format with the bit quantity of the first DCI is configured in a USS corresponding to the communication apparatus and a common search space CSS.

For technical effects of the third aspect or the fourth aspect, refer to the technical effects of the first aspect. Details are not described herein.

According to a fifth aspect, a communication apparatus is provided. The communication apparatus includes a module, unit, or means (means) configured to perform the method described in any one of the second aspect or the possible implementations of the second aspect. The module, unit, or means may be implemented by hardware or software, or implemented by hardware executing corresponding software. The hardware or the software includes one or more modules or units corresponding to the foregoing functions. For example, the communication apparatus may be a network device, or may be a chip or another component disposed in the network device. The communication apparatus may include, for example, a transceiver module and a processing module.

When the communication apparatus is configured to perform the method described in any one of the second aspect or the possible implementations of the second aspect, the processing module is configured to determine first downlink control information DCI, where the first DCI is for uplink or downlink data scheduling, a bit quantity of the first DCI is fixed, the first DCI includes a first identifier, the first identifier indicates a format of the first DCI, and the format of the first DCI includes a first DCI format or a second DCI format; and the transceiver module is configured to send the first DCI to a terminal device.

According to a sixth aspect, a communication apparatus is provided. The communication apparatus includes a module, unit, or means (means) configured to perform the method described in any one of the second aspect or the possible implementations of the second aspect. The module, unit, or means may be implemented by hardware or software, or implemented by hardware executing corresponding software. The hardware or the software includes one or more modules or units corresponding to the foregoing functions. For example, the communication apparatus may be a network device, or may be a chip or another component disposed in the network device. The communication apparatus may include, for example, a transceiver and a processor.

When the communication apparatus is configured to perform the method described in any one of the second aspect or the possible implementations of the second aspect, the processor is configured to determine first downlink control information DCI, where the first DCI is for uplink or downlink data scheduling, a bit quantity of the first DCI is fixed, the first DCI includes a first identifier, the first identifier indicates a format of the first DCI, and the format of the first DCI includes a first DCI format or a second DCI format; and the transceiver is configured to send the first DCI to a terminal device.

With reference to the fifth aspect or the sixth aspect, in a possible implementation, an information bit quantity of at least one information field in an information field included in the first DCI in the second DCI format is configurable.

With reference to the fifth aspect or the sixth aspect, in a possible implementation, a bit quantity of each information field included in the first DCI in the first DCI format is fixed.

With reference to the fifth aspect or the sixth aspect, in a possible implementation, that a bit quantity of the first DCI is fixed includes: a bit quantity of each information field included in the first DCI is fixed; the first DCI includes an information field associated with a radio resource control RRC signaling configuration, but a bit quantity corresponding to the first DCI is fixed; or a bit quantity corresponding to the first DCI is related to an initial access parameter.

With reference to the fifth aspect or the sixth aspect, in a possible implementation, the bit quantity of the first DCI is the same as a bit quantity of second DCI, and the second DCI is for scheduling common information transmission.

With reference to the fifth aspect or the sixth aspect, in a possible implementation, a terminal device corresponding to common information is a first-type terminal device, or the terminal device corresponding to the common information includes the first-type terminal device and a second-type terminal device, where a capability of the first-type terminal device is different from a capability of the second-type terminal device. For example, the capability of the first-type terminal device is weaker than the capability of the second-type terminal device.

With reference to the fifth aspect or the sixth aspect, in a possible implementation, when the common information is system information, the second DCI includes control information for scheduling a system information block type 1 or other system information, and the second DCI is scrambled by a system information radio network temporary identifier SI-RNTI; the common information is a paging message, and the second DCI is scrambled by a paging radio network temporary identifier P-RNTI; or the common information is random access response RAR information, and the second DCI is scrambled by a random access radio network temporary identifier RA-RNTI.

With reference to the fifth aspect or the sixth aspect, in a possible implementation, that the bit quantity of the first DCI is the same as a bit quantity of second DCI includes: a sum of bit quantities of all information fields included in the first DCI is the same as a sum of bit quantities of all information fields included in the second DCI; a bit quantity of original information of the first DCI is the same as a bit quantity of original information of the second DCI, where the bit quantity of the original information is a bit quantity of to-be-transmitted DCI on which a cyclic redundancy check CRC operation has not been performed; a bit quantity of the first DCI on which a channel coding operation has not been performed is the same as a bit quantity of the second DCI on which the channel coding operation has not been performed; a quantity of modulated symbols corresponding to transmission of the first DCI is the same as a quantity of modulated symbols corresponding to transmission of the second DCI; or a bit quantity corresponding to a modulated symbol that corresponds to transmission of the first DCI and that has been demodulated is the same as a bit quantity corresponding to a modulated symbol that corresponds to transmission of the second DCI and that has been demodulated.

With reference to the fifth aspect or the sixth aspect, in a possible implementation, the first DCI in the first DCI format includes one or more of the following information fields: a first information field, where the first information field indicates frequency domain resource allocation information; a second information field, where the second information field indicates time domain resource allocation information; a third information field, where the third information field indicates a modulation and coding scheme MCS; a fourth information field, where the fourth information field indicates a redundancy version RV indicator; or a fifth information field, where the fifth information field indicates a hybrid automatic repeat request HARQ process number.

With reference to the fifth aspect or the sixth aspect, in a possible implementation, when the first DCI is for downlink data scheduling, the first DCI in the first DCI format further includes one or more of the following information fields: a sixth information field, where the sixth information field indicates transmit power control TPC information for scheduling a physical uplink control channel PUCCH; a seventh information field, where the seventh information field indicates a PUCCH resource; or an eighth information field, where the eighth information field indicates a timing relationship between downlink data transmission scheduled by using the first DCI and a HARQ feedback.

With reference to the fifth aspect or the sixth aspect, in a possible implementation, when the first DCI is for uplink data scheduling, the first DCI in the first DCI format further includes a ninth information field, where the ninth information field indicates transmit power control TPC information for scheduling a physical uplink shared channel PUSCH.

With reference to the fifth aspect or the sixth aspect, in a possible implementation, the first DCI in the second DCI format includes an information field for a first data transmission function and an information field for a second data transmission function, where the first data transmission function indicates a basic function for scheduling data transmission, and the second data transmission function indicates an additional function for scheduling data transmission.

With reference to the fifth aspect or the sixth aspect, in a possible implementation, the information field for the first data transmission function includes one or more of the following information fields: a first information field, where the first information field indicates frequency domain resource allocation information; a second information field, where the second information field indicates time domain resource allocation information; a third information field, where the third information field indicates a modulation and coding scheme MCS; a fourth information field, where the fourth information field indicates a redundancy version RV indicator; or a fifth information field, where the fifth information field indicates a HARQ process number.

With reference to the fifth aspect or the sixth aspect, in a possible implementation, when the first DCI is for downlink data scheduling, the information field for the first data transmission function further includes one or more of the following information fields: a sixth information field, where the sixth information field indicates transmit power control TPC information for scheduling a physical uplink control channel PUCCH; a seventh information field, where the seventh information field indicates a PUCCH resource; or an eighth information field, where the eighth information field indicates a timing relationship between downlink data transmission scheduled by using the first DCI and a HARQ feedback.

With reference to the fifth aspect or the sixth aspect, in a possible implementation, when the first DCI is for uplink data scheduling, the information field for the first data transmission function further includes a ninth information field, where the ninth information field indicates transmit power control TPC information for scheduling a PUSCH.

With reference to the fifth aspect or the sixth aspect, in a possible implementation, the information field for the second data transmission function includes one or more of the following information fields: a tenth information field, where the tenth information field indicates control information related to multi-antenna data transmission; an eleventh information field, where the eleventh information field indicates control information related to a code block group CBG; a twelfth information field, where the twelfth information field indicates beam-related control information; a thirteenth information field, where the thirteenth information field indicates carrier-related control information; or a fourteenth information field, where the fourteenth information field indicates control information related to bandwidth part BWP switching.

With reference to the fifth aspect or the sixth aspect, in a possible implementation, whether the information field for the second data transmission function is valid is indicated by using a control field in the first DCI in the second DCI format in a bitmap or binary manner, where parameter information corresponding to a valid information field is configured by using RRC signaling.

With reference to the fifth aspect or the sixth aspect, in a possible implementation, only a DCI format with the bit quantity of the first DCI is configured in a user search space USS corresponding to the terminal device.

With reference to the fifth aspect or the sixth aspect, in a possible implementation, only a DCI format with the bit quantity of the first DCI is configured in a USS corresponding to the terminal device and a common search space CSS.

For technical effects of the fifth aspect or the sixth aspect, refer to the technical effects of the second aspect. Details are not described herein.

According to a seventh aspect, a communication apparatus is provided. The communication apparatus may be the terminal device in any one of the first aspect or the possible implementations of the first aspect, or a module used in the terminal device, for example, a chip or a chip system; or the communication apparatus may be the network device in any one of the second aspect or the possible implementations of the second aspect, or a module used in the network device, for example, a chip or a chip system. The communication apparatus includes a processor, configured to perform the method according to any one of the foregoing corresponding aspect or the possible implementations of the corresponding aspect.

For example, the communication apparatus further includes a memory. The memory is coupled to the processor, and the processor is configured to perform the method according to any one of the foregoing corresponding aspect or the possible implementations of the corresponding aspect.

In a possible design, the memory is configured to store program instructions and data. The memory is coupled to the processor, and the processor may invoke and execute the program instructions stored in the memory, to perform the method according to any one of the foregoing corresponding aspect or the possible implementations of the corresponding aspect.

For example, the communication apparatus further includes a communication interface, and the communication interface is used by the communication apparatus to communicate with another device. The communication interface may be a transceiver, an input/output interface, a circuit, or the like.

In a possible design, the communication apparatus includes a processor and a communication interface, to perform the method according to any one of the foregoing corresponding aspect or the possible implementations of the corresponding aspect. Specifically, the processor communicates with an external device through the communication interface, and the processor is configured to run a computer program, to enable the communication apparatus to perform the method according to any one of the foregoing corresponding aspect or the possible implementations of the corresponding aspect. It may be understood that the external device may be an object other than the processor, or an object other than the communication apparatus.

In another possible design, the communication apparatus is a chip or a chip system. The communication interface may be an input/output interface, an interface circuit, an output circuit, an input circuit, a pin, a related circuit, or the like in the chip or the chip system. The processor may alternatively be embodied as a processing circuit or a logic circuit.

According to an eighth aspect, a computer-readable storage medium is provided. The computer-readable storage medium stores a computer program; and when the computer program is executed by a communication apparatus, the communication apparatus is enabled to perform the method according to any one of the first aspect or the possible implementations of the first aspect, or perform the method according to any one of the second aspect or the possible implementations of the second aspect.

According to a ninth aspect, a computer program product including instructions is provided. When the instructions are executed by a computer, a communication apparatus is enabled to perform the method according to any one of the first aspect or the possible implementations of the first aspect, or perform the method according to any one of the second aspect or the possible implementations of the second aspect.

According to a tenth aspect, a chip is provided. The chip includes a processor and an interface. The processor is coupled to a memory through the interface. When the processor executes a computer program or instructions in the memory, the method according to any one of the first aspect or the possible implementations of the first aspect or the method according to any one of the second aspect or the possible implementations of the second aspect is performed.

For technical effects brought by any one of the designs of the seventh aspect to the tenth aspect, refer to technical effects brought by different designs of the first aspect or the second aspect. Details are not described herein again.

According to an eleventh aspect, a communication system is provided. The communication system includes a terminal device and a network device. The network device is configured to: after determining first downlink control information DCI, send the first DCI to the terminal device. The terminal device is configured to: receive the first DCI from the network device, and receive downlink data from the network device or send uplink data to the network device based on the first DCI. The first DCI is for uplink or downlink data scheduling, a bit quantity of the first DCI is fixed, the first DCI includes a first identifier, the first identifier indicates a format of the first DCI, and the format of the first DCI includes a first DCI format or a second DCI format. For technical effects of the eleventh aspect, refer to the technical effects of the first aspect or the second aspect. Details are not described herein again.

DESCRIPTION OF EMBODIMENTS

Figure 1:
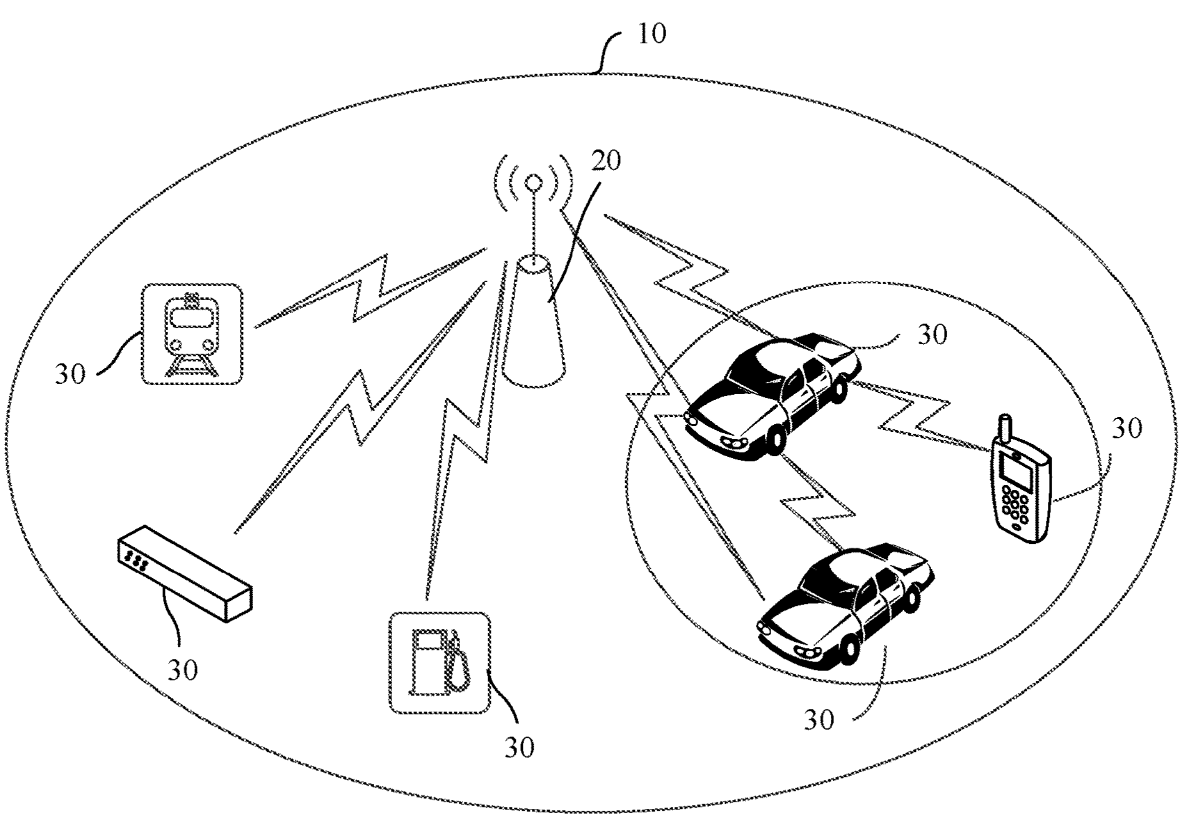
FIG. 1 is a schematic diagram of an architecture of a communication system according to an embodiment of this application.

For ease of understanding of the technical solutions in embodiments of this application, the technologies related to this application are first briefly described as follows.

Currently, a terminal device generally determines, by receiving DCI sent by a network device, necessary information for performing data transmission with the network device. For example, the terminal device may determine, by receiving common control information sent by the network device, common information sent by the network device. For another example, the terminal device may complete data transmission with the network device by receiving terminal device-specific control information sent by the network device. Data transmission herein includes uplink data transmission and/or downlink data transmission. Generally, the common control information sent by the network device is scrambled by a common radio network temporary identifier (radio network temporary identifier, RNTI). The common control information may be cell-specific common information, or may be user group-specific common information. A difference between the cell-specific common information and the user group-specific common information lies in that: The cell-specific common information is valid for all terminal devices in a cell, while the user group-specific common information is valid only for a group of specific terminal devices. The terminal device-specific control information sent by the network device is scrambled by a terminal device-specific RNTI.

When the terminal device detects DCI sent by the network device, some power consumption is inevitably caused. Generally, the terminal device detects, on some candidate resources, whether there is DCI that needs to be received by the terminal device. The DCI that needs to be received by the terminal device includes, but is not limited to: cell-specific common control information, user group-specific common control information, and the terminal device-specific control information that are sent by the network device. For ease of description, the candidate resources may be represented by using physical downlink control channel candidates (physical downlink control channel candidates, PDCCH candidates). This is because DCI is generally carried on a PDCCH. Therefore, candidate resources for sending the DCI may be represented by using PDCCH candidates. In addition, the terminal device may alternatively detect a plurality of pieces of DCI on one candidate resource, and the plurality of pieces of DCI may be classified based on DCI sizes (DCI sizes). DCI with a same DCI size may be distinguished by different RNTIs. Therefore, it may be considered that the terminal device needs to perform detection for the DCI size only once on the candidate resource, to determine the control information sent by the network device. In addition, for DCI with different DCI sizes, a quantity of pieces of DCI that needs to be detected by the terminal device on the candidate resource is the same as a quantity of pieces of DCI with different DCI sizes. It should be noted that the DCI size herein includes an original information element sent by the network device, or includes the original information element and a cyclic redundancy check (cyclic redundancy check, CRC) bit.

It may be learned from the foregoing description that, power consumption of detecting DCI by the terminal device is related to a quantity of candidate resources for sending the DCI and a quantity of DCI sizes (sizes). Generally, a larger quantity of candidate resources for sending the DCI indicates a larger quantity of different DCI sizes that need to be detected, and indicates higher power consumption of detecting the DCI by the terminal device.

In the conventional technology, assuming that the terminal device detects DCI (which may also be considered as detecting a PDCCH) in a cell A, a maximum quantity of different DCI sizes that are configured to be detected by the terminal device is 4. A maximum quantity of blind detection times for detecting the DCI by the terminal device in a downlink bandwidth part (bandwidth part, BWP) of the cell A based on different subcarrier spacings (subcarrier spacings, SCSs) is shown in Table 1.

TABLE 1

| SCS | Maximum quantity of blind detection times |
|---|---|
| 15 kHz | 44 |
| 30 kHz | 36 |
| 60 kHz | 22 |
| 120 kHz | 20 |

It may be learned from this that, in the conventional technology, there are a large quantity of different DCI sizes, and this results in a large quantity of blind detection times. If the conventional technology is directly applied to a DCI detection process of an NR REDCAP terminal device, power consumption of the NR REDCAP terminal device cannot be reduced.

To reduce power consumption of detecting DCI by the terminal device, the following describes technical solutions in embodiments of this application with reference to the accompanying drawings in embodiments of this application.

Embodiments of this application are applicable to a long term evolution (long term evolution, LTE) system or an NR system (which may also be referred to as a 5G system), or are applicable to another future-oriented new system, or the like. This is not specifically limited in embodiments of this application. In addition, the terms "system" and "network" may be interchangeable.

FIG. 1 shows a communication system 10 according to an embodiment of this application. The communication system 10 includes a network device 20 and one or more terminal devices 30 connected to the network device 20. The terminal device 30 is connected to the network device 20 in a wireless manner. Optionally, different terminal devices 30 may communicate with each other. The terminal device 30 may be located at a fixed location, or may be mobile.

It should be noted that FIG. 1 is merely a schematic diagram. The communication system 10 may further include another device. For example, the communication system 10 may further include one or more of a core network device, a wireless relay device, and a wireless backhaul device though they are not shown in the figure. This is not specifically limited herein. The network device 20 may be connected to the core network device in a wireless or wired manner. The core network device and the network device 20 may be different independent physical devices, or functions of the core network device and logical functions of the network device 20 may be integrated into a same physical device, or some functions of the core network device and some functions of the network device 20 may be integrated into one physical device. This is not specifically limited in this embodiment of this application.

For example, as shown in FIG. 1, the network device 20 interacts with any terminal device 30. In this embodiment of this application, after determining first DCI, the network device 20 sends the first DCI to the terminal device 30. Correspondingly, the terminal device 30 receives the first DCI from the network device 20. The first DCI is for uplink or downlink data scheduling, a bit quantity of the first DCI is fixed, the first DCI includes a first identifier, the first identifier indicates a format of the first DCI, and the format of the first DCI includes a first DCI format or a second DCI format. Further, the terminal device 30 receives downlink data from the network device 20 or sends uplink data to the network device 20 based on the first DCI. Specific implementation of this solution is to be described in detail in subsequent method embodiment. Details are not described herein. Based on this solution, because the bit quantity of the first DCI is fixed, and the first DCI has a plurality of DCI formats, which means that one DCI size may be designed for DCI in a plurality of formats, this can reduce complexity of detecting the DCI by the terminal device, to reduce power consumption of the terminal device, and ensure diversity of data transmission, to improve scheduling flexibility.

Optionally, the network device 20 in this embodiment of this application is a device connecting the terminal device 30 to a wireless network. The network device 20 may be a base station (base station), an evolved NodeB (evolved NodeB, eNodeB), a transmission reception point (transmission reception point, TRP), a next generation NodeB (next generation NodeB, gNB) in a 5G mobile communication system, a base station in a future mobile communication system, an access node in a wireless fidelity (wireless fidelity, Wi-Fi) system, or the like; or may be a module or unit that completes some functions of the base station, for example, may be a centralized unit (centralized unit, CU), or may be a distributed unit (distributed unit, DU). A specific technology and a specific device form that are used by the network device are not limited in this embodiment of this application. In this application, unless otherwise specified, the network device is a radio access network device.

Optionally, the terminal device 30 in this embodiment of this application may be a device configured to implement a wireless communication function, for example, a terminal or a chip that may be used in the terminal. The terminal may also be referred to as user equipment (user equipment, UE), a mobile station, a mobile terminal, or the like. The terminal may be a mobile phone, a tablet computer, a computer having a wireless transceiver function, a virtual reality terminal device, an augmented reality terminal device, a wireless terminal in industrial control, a wireless terminal in self-driving, a wireless terminal in remote surgery, a wireless terminal in a smart grid, a wireless terminal in transportation safety, a wireless terminal in a smart city, a wireless terminal in a smart home, or the like. This disclosure is not limited to either a specific technology or a specific device.

Optionally, the network device 20 and the terminal device 30 in this embodiment of this application may be deployed on land, including indoor, outdoor, handheld, or vehicle-mounted devices; may be deployed on the water; or may be deployed on airplanes, balloons and satellites in the air. Application scenarios of the network device 20 and the terminal device 30 are not limited in this embodiment of this application.

Optionally, the network device 20 and the terminal device 30 in this embodiment of this application may communicate with each other by using a licensed spectrum, may communicate with each other by using an unlicensed spectrum, or may communicate with each other by using both the licensed spectrum and the unlicensed spectrum. The network device 20 and the terminal device 30 may communicate with each other by using a spectrum below 6 gigahertz (gigahertz, GHz), may communicate with each other by using a spectrum above 6 GHz, or may communicate with each other by using both the spectrum below 6 GHz and the spectrum above 6 GHz. A spectrum resource used between the network device 20 and the terminal device 30 is not limited in this embodiment of this application.

Optionally, the network device or the terminal device in this embodiment of this application may also be referred to as a communication apparatus, and may be a general-purpose device or a dedicated device. This is not specifically limited in this embodiment of this application.

Optionally, a related function of the network device or the terminal device in this embodiment of this application may be implemented by one device, may be jointly implemented by a plurality of devices, or may be implemented by one or more functional modules in one device. This is not specifically limited in this embodiment of this application. It may be understood that the foregoing function may be a network element in a hardware device, or may be a software function running on dedicated hardware, a combination of hardware and software, or a virtualization function instantiated on a platform (for example, a cloud platform).

Figure 2:
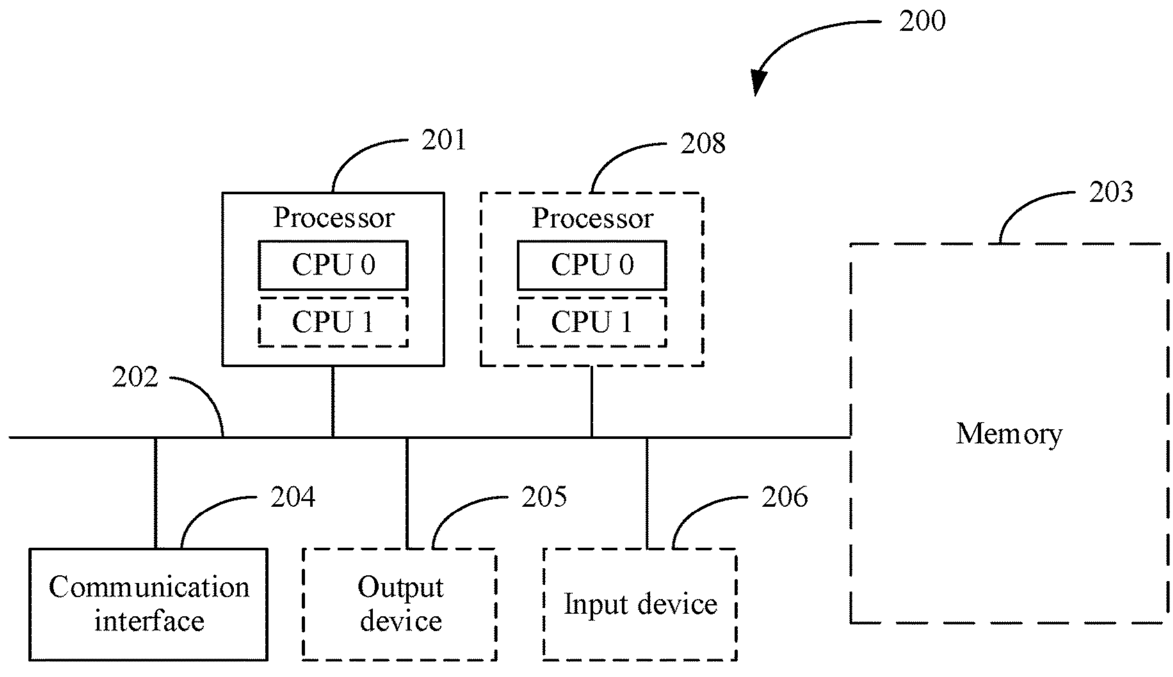
FIG. 2 is a schematic diagram of a structure of a communication device according to an embodiment of this application.

For example, the related function of the network device or the terminal device in this embodiment of this application may be implemented by using a communication device (which may also be referred to as a communication apparatus) 200 in FIG. 2. FIG. 2 is a schematic diagram of a structure of a communication device 200 according to an embodiment of this application. The communication device 200 includes one or more processors 201, a communication line 202, and at least one communication interface (only an example in which the communication device 200 includes a communication interface 204 and one processor 201 is used in FIG. 2 for description). Optionally, the communication device 200 may further include a memory 203.

The processor 201 may be a general-purpose central processing unit (central processing unit, CPU), a microprocessor, an application-specific integrated circuit (application-specific integrated circuit, ASIC), or one or more integrated circuits configured to control execution of programs in the solutions in this application.

The communication line 202 may include a path, to connect different components.

The communication interface 204 may be a transceiver module configured to communicate with another device or a communication network, for example, the Ethernet, a RAN, or a wireless local area network (wireless local area network, WLAN). For example, the transceiver module may be an apparatus such as a transceiver or a transceiver machine. Optionally, the communication interface 204 may alternatively be a transceiver circuit located in the processor 201, and is configured to implement signal input and signal output of the processor.

The memory 203 may be an apparatus having a storage function. For example, the memory 203 may be a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another optical disc storage, an optical disc storage (including a compact optical disc, a laser disc, an optical disc, a digital versatile optical disc, a Blu-ray disc, and the like), a magnetic disk storage medium or another magnetic storage device, or any other medium that can be used to carry or store expected program code in a form of an instruction or a data structure and that can be accessed by a computer. The memory may exist independently, and is connected to the processor through the communication line 202. The memory may alternatively be integrated with the processor.

The memory 203 is configured to store computer-executable instructions for executing the solutions in this application, and the processor 201 controls the execution. The processor 201 is configured to execute the computer-executable instructions stored in the memory 203, to implement a communication method provided in embodiments of this application.

Alternatively, optionally, in this embodiment of this application, the processor 201 may perform processing related functions in the communication method provided in the following embodiment in this application, and the communication interface 204 is responsible for communication with another device or a communication network. This is not specifically limited in this embodiment of this application.

Optionally, the computer-executable instructions in this embodiment of this application may also be referred to as application program code. This is not specifically limited in this embodiment of this application.

During specific implementation, in an embodiment, the processor 201 may include one or more CPUs, for example, a CPU 0 and a CPU 1 in FIG. 2.

During specific implementation, in an embodiment, the communication device 200 may include a plurality of processors, for example, the processor 201 and a processor 208 in FIG. 2. Each of the processors may be a single-core (single-core) processor or a multi-core (multi-core) processor. The processor herein may include but is not limited to at least one of the following various computing devices that run software: a central processing unit (central processing unit, CPU), a microprocessor, a digital signal processor (DSP), a microcontroller unit (microcontroller unit, MCU), an artificial intelligence processor, or the like. Each computing device may include one or more cores configured to perform an operation or processing by executing software instructions.

During specific implementation, in an embodiment, the communication device 200 may further include an output device 205 and an input device 206. The output device 205 communicates with the processor 201, and may display information in a plurality of manners. For example, the output device 205 may be a liquid crystal display (liquid crystal display, LCD), a light emitting diode (light emitting diode, LED) display device, a cathode ray tube (cathode ray tube, CRT) display device, or a projector (projector). The input device 206 communicates with the processor 201, and may receive an input from a user in a plurality of manners. For example, the input device 206 may be a mouse, a keyboard, a touchscreen device, or a sensor device.

The communication device 200 may also be referred to as a communication apparatus sometimes, and may be a general-purpose device or a dedicated device. For example, the communication device 200 may be a desktop computer, a portable computer, a network server, a palmtop computer (personal digital assistant, PDA), a mobile phone, a tablet computer, a wireless terminal device, an embedded device, the foregoing terminal device, the foregoing network device, or a device having a structure similar to the structure shown in FIG. 2. A type of the communication device 200 is not limited in this embodiment of this application.

Figure 3:
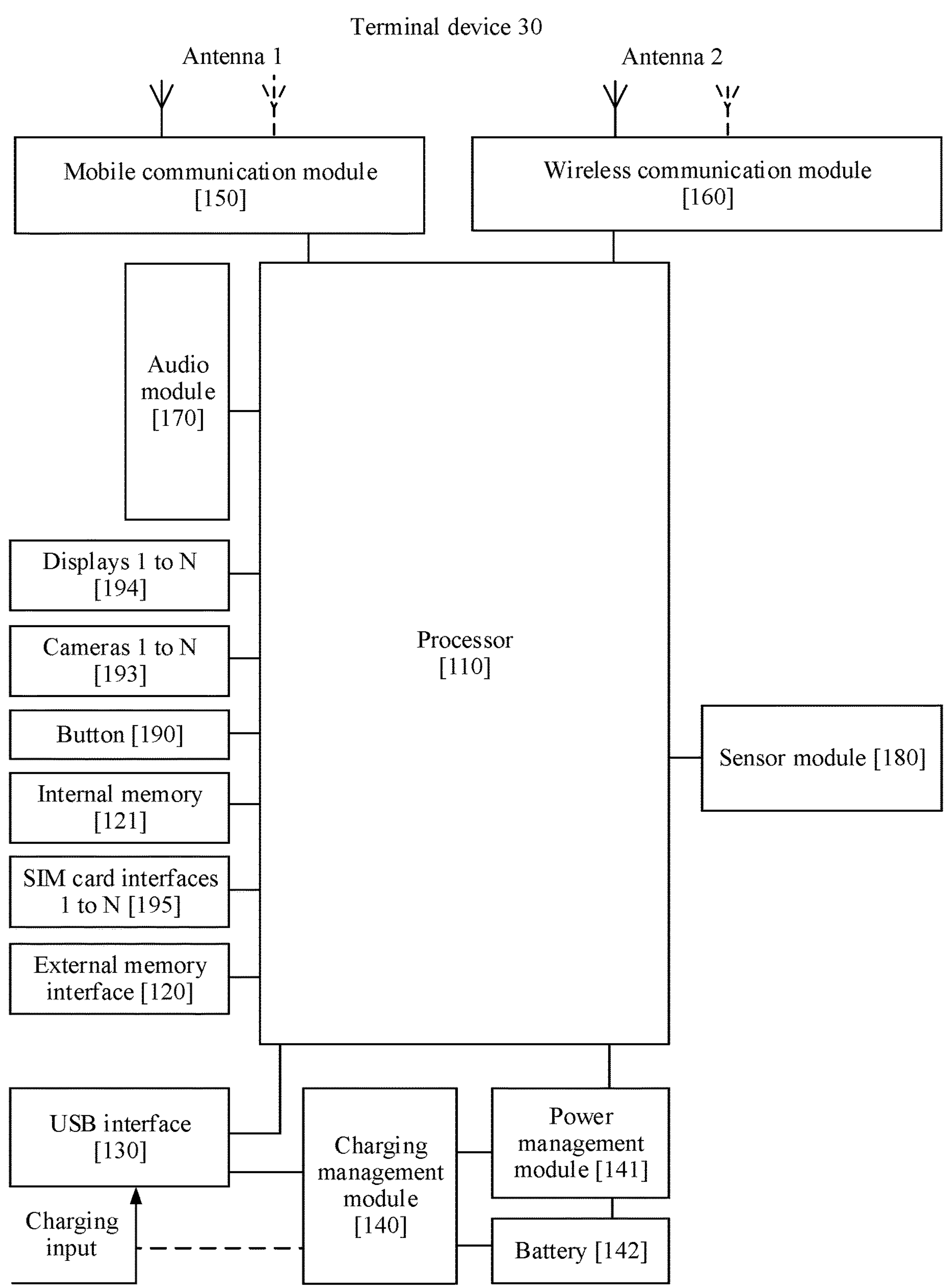
FIG. 3 is a schematic diagram of another structure of a terminal device according to an embodiment of this application.

With reference to the schematic diagram of the structure of the communication device 200 shown in FIG. 2, for example, FIG. 3 shows a specific structural form of a terminal device 30 according to an embodiment of this application.

In some embodiments, a function of the processor 201 in FIG. 2 may be implemented by using a processor 110 in FIG. 3.

In some embodiments, a function of the communication interface 204 in FIG. 2 may be implemented by using an antenna 1, an antenna 2, a mobile communication module 150, a wireless communication module 160, and the like in FIG. 3. The mobile communication module 150 may provide a solution that is applied to the terminal device 30 and that includes a wireless communication technology such as LTE, NR, or future mobile communication. The wireless communication module 160 may provide a solution that is applied to the terminal device 30 and that includes a wireless communication technology such as WLAN (for example, a Wi-Fi network), Bluetooth (Bluetooth, BT), a global navigation satellite system (global navigation satellite system, GNSS), frequency modulation (frequency modulation, FM), near field communication (near field communication, NFC), and infrared. In some embodiments, the antenna 1 of the terminal device 30 is coupled to the mobile communication module 150, and the antenna 2 is coupled to the wireless communication module 160, so that the terminal device 30 can communicate with a network and another device by using a wireless communication technology.

In some embodiments, a function of the memory 203 in FIG. 2 may be implemented by using an internal memory 121 in FIG. 3, an external memory connected to an external memory interface 120, or the like.

In some embodiments, a function of the output device 205 in FIG. 2 may be implemented by using a display 194 in FIG. 3.

In some embodiments, a function of the input device 206 in FIG. 2 may be implemented by using a mouse, a keyboard, a touchscreen device, or a sensor module 180 in FIG. 3.

In some embodiments, as shown in FIG. 3, the terminal device 30 may further include one or more of an audio module 170, a camera 193, a button 190, a SIM card interface 195, a USB interface 130, a charging management module 140, a power management module 141, and a battery 142.

It may be understood that the structure shown in FIG. 3 does not constitute a specific limitation on the terminal device 30. For example, in some other embodiments of this application, the terminal device 30 may include more or fewer components than those shown in the figure, or some components may be combined, or some components may be split, or the components may be differently arranged. The components shown in the figure may be implemented by hardware, software, or a combination of software and hardware.

With reference to FIG. 1 to FIG. 3, the following describes, by using an example in which the network device 20 and any terminal device 30 shown in FIG. 1 interact with each other, the communication method provided in embodiments of this application.

It should be noted that in the following embodiments of this application, names of messages between network elements, names of parameters in messages, or the like are merely examples, and may be other names during specific implementation. This is not specifically limited in embodiments of this application.

Figure 4:
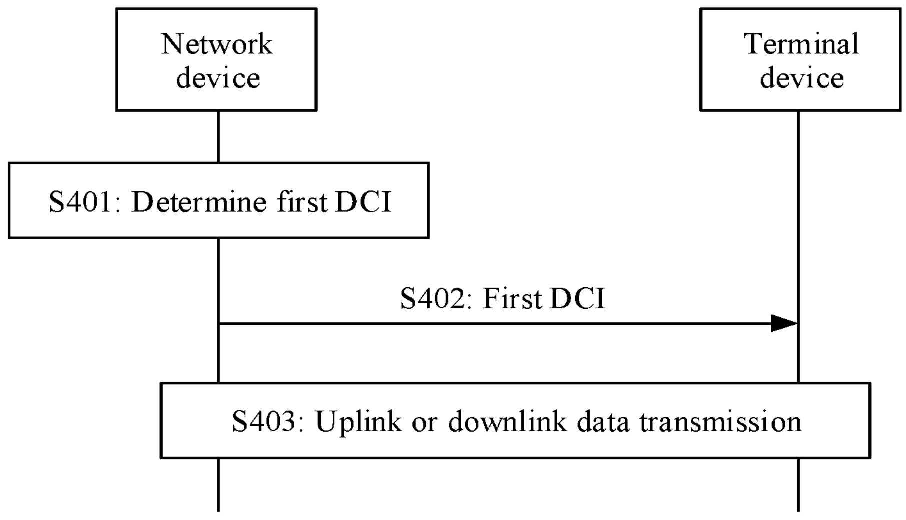
FIG. 4 is a schematic flowchart of a communication method according to an embodiment of this application.

FIG. 4 shows a communication method according to an embodiment of this application. The communication method includes the following steps S401 to S403.

S401: A network device determines first DCI. The first DCI is for uplink or downlink data scheduling, a bit quantity of the first DCI is fixed, the first DCI includes a first identifier, the first identifier indicates a format of the first DCI, and the format of the first DCI includes a first DCI format or a second DCI format.

S402: The network device sends the first DCI to a terminal device. Correspondingly, the terminal device receives the first DCI from the network device.

S403: The terminal device performs uplink or downlink data transmission with the network device based on the first DCI, for example, receives downlink data from the network device or sends uplink data to the network device.

The following specifically describes the foregoing steps S401 to S403.

In this embodiment of this application, that the first DCI is for scheduling uplink data transmission may be understood as that the first DCI includes scheduling information for uplink data transmission (uplink scheduling information for short). That the first DCI is for scheduling downlink data transmission may be understood as that the first DCI includes scheduling information for downlink data transmission (downlink scheduling information for short). Specifically, whether the first DCI is for scheduling uplink data transmission or for scheduling downlink data transmission may be explicitly or implicitly indicated by using an information field included in the first DCI.

For example, different values of one bit included in the first DCI may indicate whether the first DCI is for scheduling uplink or downlink data transmission. For example, if the value of the bit is 0, it indicates that the first DCI is for scheduling uplink data transmission; if the value of the bit is 1, it indicates that the first DCI is for scheduling downlink data transmission. Alternatively, if the value of the bit is 1, it indicates that the first DCI is for scheduling downlink data transmission; if the value of the bit is 0, it indicates that the first DCI is for scheduling uplink data transmission.

For another example, a special state of the information field included in the first DCI may be reused to indicate whether the first DCI is for scheduling uplink or downlink data transmission. For example, an information field included in first control information corresponds to M bits, and the M bits may represent 2^M (2 raised to the power of M) states in total, some of the 2— M states may indicate whether the first DCI is for scheduling uplink or downlink data transmission. Specifically, for example, if values of all the M bits are 1, it may indicate that the first DCI is for scheduling uplink data transmission; if values of all the M bits are 0, it may indicate that the first DCI is for scheduling downlink data transmission. Alternatively, if values of all the M bits are 1, it may indicate that the first DCI is for scheduling downlink data transmission; if values of all the M bits are 0, it may indicate that the first DCI is for scheduling uplink data transmission. The information field in the first DCI may be understood as an information bit field for implementing a data transmission function. For example, the information field indicates a frequency resource for data transmission, or indicates a time domain resource for data transmission.

In this embodiment of this application, the first DCI is terminal device-specific DCI. The terminal device-specific DCI may be understood as the first DCI that is valid only for the terminal device. For example, the first DCI may be scrambled by a cell radio network temporary identifier (cell Radio network temporary identifier, C-RNTI) corresponding to the terminal device. Certainly, the first DCI may alternatively be scrambled in another manner. This is not specifically limited in this embodiment of this application. In this embodiment of this application, that the first DCI is scrambled by the C-RNTI corresponding to the terminal device may be understood as that the C-RNTI is used to scramble a CRC parity bit of the first DCI. This is uniformly described herein, and details are not described below again.

In this embodiment of this application, that a bit quantity of the first DCI is fixed may be understood as that a bit quantity (payload size) of the first DCI is fixed. For example, at least one of the following understandings may be included.

(1) A bit quantity corresponding to each information field included in the first DCI is a fixed value, and does not vary with a radio resource control (radio resource control, RRC) signaling configuration parameter. For example, when the information field in the first DCI indicates a time resource for data transmission, a corresponding bit quantity is 4. Even if the network device configures different time resource parameters by using RRC signaling, the bit quantity of the information field is still 4.

(2) The first DCI includes an information field associated with an RRC signaling configuration, but the bit quantity corresponding to the first DCI is fixed. For example, the first DCI includes three different information fields in total, which respectively indicate the frequency resource for data transmission, the time domain resource for data transmission, and a modulation and coding scheme (modulation and coding scheme, MCS). Bit quantities corresponding to the three different information fields may all be determined based on the RRC signaling configuration. For example, if the network device configures, by using RRC signaling, 16 types of frequency resources for data transmission, an information field that is in the first control information and that indicates the frequency resource for data transmission may correspond to four bits. For another example, if the network device configures, by using RRC signaling, eight types of frequency resources for data transmission, an information field that is in the first control information and that indicates the frequency resource for data transmission may correspond to three bits. In this case, although the bit quantity corresponding to the information field indicating the frequency resource for data transmission may change, it needs to be ensured that the bit quantity corresponding to the first DCI is fixed.

(3) The bit quantity corresponding to the first DCI is related to an initial access parameter. In other words, the bit quantity corresponding to the first DCI is variable, but a specific value (or a variable range of the bit quantity corresponding to the first DCI) is related only to the initial access parameter. Once the initial access parameter is determined, the bit quantity corresponding to the first DCI is fixed.

Optionally, in this embodiment of this application, the initial access parameter is, for example, information included in a synchronization signal block (synchronization signal block, SSB). For example, the information included in the SSB may be, for example, SSB index information or control information carried on a physical broadcast channel (physical broadcast channel, PBCH) included in the SSB, that is, information indicated by a master information block (master information block, MIB). Specifically, the SSB index information may be, for example, an SSB time index (SSB time index), and the information indicated by the MIB may include, for example, information indicated by using a PDCCH configuration information for system information block type 1 (pdcch-ConfigSIB1) in the MIB, or configuration information of a control resource set 0 (control resource set #0, CORESET #0) included in the MIB. A frequency resource of the CORESET #0 corresponds to a frequency resource of an initial bandwidth part (initial bandwidth part, initial BWP), and a time resource of the CORESET #0 corresponds to a time resource including control information for scheduling common information transmission. For example, the time resource may be represented by using a search space (search space, SS) corresponding to the control information for scheduling common information transmission. Common information transmission may be, for example, system information (system information, SI) broadcast by the network device, paging information (paging message) broadcast by the network device, or a random access response (random access response, RAR) broadcast by the network device. For example, when the frequency resource of the CORESET #0 corresponds to 24 resource blocks (resource blocks, RBs), 48 RBs, or 96 RBs, the bit quantity corresponding to the first DCI may be X1, X2, or X3, where X1≤X2≤X3.

Alternatively, optionally, in this embodiment of this application, the initial access parameter is, for example, a bandwidth capability of the terminal device. For example, when the bandwidth capability of the terminal device is 5 MHz, 10 MHz, or 20 MHz, the bit quantity corresponding to the first DCI may be Y1, Y2, or Y3, where Y1≤Y2≤Y3.

Optionally, in this embodiment of this application, the bit quantity of the first DCI may be designed to be the same as a bit quantity of second DCI, and the second DCI is for scheduling common information transmission. As described above, common information herein may include the SI, the paging information, the RAR, or the like broadcast by the network device. In other words, it is considered that, before establishing a data transmission link with the network device, the terminal device detects the common information (for example, the SI broadcast by the network device) transmitted by the network device, to obtain basic configuration information of the network device. In addition, the common information transmitted by the network device may alternatively be implemented in a DCI scheduling manner. To be specific, the network device may indicate, by using DCI, the control information for scheduling common information transmission, and the terminal device may determine, by detecting the DCI, the control information for scheduling common information transmission, and receive, based on the control information, the common information transmitted by the network device. Therefore, in this embodiment of this application, the bit quantity of the first DCI may be designed to be the same as the bit quantity of the second DCI for scheduling common information transmission, so that a quantity of pieces of DCI that is to be detected by the terminal device and with different DCI sizes can be further reduced, thereby reducing power consumption of the terminal device. Optionally, in this embodiment of this application, the terminal device may distinguish between the first DCI and the second DCI by different RNTIs.

When the common information is the SI broadcast by the network device, the second DCI includes control information for scheduling a SIB 1 or other system information, and the other system information may be, for example, a SIB 2 or a SIB 3. In addition, the second DCI may further include a radio network temporary identifier (system information radio network temporary identifier, SI-RNTI). For example, the second DCI may be scrambled by the system information SI-RNTI.

Alternatively, when the common information is the paging message broadcast by the network device, the second DCI may include a paging radio network temporary identifier (paging radio network temporary identifier, P-RNTI). For example, the second DCI may be scrambled by the P-RNTI.

Alternatively, when the common information is RAR information broadcast by the network device, the second DCI may include a random access radio network temporary identifier (random access radio network temporary identifier, RA-RNTI). For example, the second DCI may be scrambled by the RA-RNTI.

Optionally, in this embodiment of this application, a terminal device corresponding to the common information may be a first-type terminal device, that is, only the first-type terminal device can parse the common information. Alternatively, a terminal device corresponding to the common information may include a first-type terminal device and a second-type terminal device, that is, both the first-type terminal device and the second-type terminal device can parse the common information. A capability of the first-type terminal device is different from a capability of the second-type terminal device. In FIG. 4, the terminal device that interacts with the network device is the first-type terminal device.

Optionally, in this embodiment of this application, that a capability of the first-type terminal device is different from a capability of the second-type terminal device may include at least one of the following understandings:

(a) A bandwidth capability of the first-type terminal device is different from a bandwidth capability of the second-type terminal device. Optionally, the bandwidth capability of the first-type terminal device is weaker than the bandwidth capability of the second-type terminal device. For example, the second-type terminal device can support data transmission with the network device by using a frequency resource with maximum bandwidth of 100 MHz on one carrier, and the first-type terminal device can support data transmission with the network device by using a frequency resource with maximum bandwidth of 20 MHz, 10 MHz, or 5 MHz on one carrier.

(b) A quantity of transmit and receive antennas of the first-type terminal device is different from a quantity of transmit and receive antennas of the second-type terminal device. Optionally, the quantity of transmit and receive antennas of the first-type terminal device is less than the quantity of transmit and receive antennas of the second-type terminal device. For example, the second-type terminal device can support 4R2T or 4R1T, and the first-type terminal device supports 2R1T or 1R1T at most.

(c) A maximum uplink transmit power of the first-type terminal device is different from a maximum uplink transmit power of the second-type terminal device. Optionally, the maximum uplink transmit power of the first-type terminal device is less than the maximum uplink transmit power of the second-type terminal device. For example, the maximum uplink transmit power of the second-type terminal device may be 23 dBm or 26 dBm, and the maximum uplink transmit power of the first-type terminal device can be only one value from 4 dBm to 20 dBm.

(d) A protocol release of the first-type terminal device is different from a protocol release of the second-type terminal device. Optionally, the protocol release of the first-type terminal device is later than the protocol release of the second-type terminal device. For example, the second-type terminal device is a terminal device of NR release 15 and/or a terminal device of NR release 16, and the first-type terminal device is a terminal device of NR release 17 and/or a terminal device of a release later than NR release 17. In this embodiment of this application, the terminal device of NR release 16 and a terminal device of a release before NR release 16 may also be referred to as NR-legacy (NR-Legacy) terminal devices. This is uniformly described herein, and details are not described below again.

(e) A carrier aggregation capability of the first-type terminal device is different from a carrier aggregation capability of the second-type terminal device. Optionally, the carrier aggregation capability of the first-type terminal device is weaker than the carrier aggregation capability of the second-type terminal device. For example, the second-type terminal device supports carrier aggregation, and the first-type terminal device does not support carrier aggregation. For another example, both the first-type terminal device and the second-type terminal device support carrier aggregation, but a maximum quantity of carriers simultaneously supported by the second-type terminal device for aggregation is greater than a maximum quantity of carriers simultaneously supported by the first-type terminal device for aggregation. For example, the second-type terminal device can simultaneously support aggregation of a maximum of five carriers or 32 carriers, and the first-type terminal device simultaneously supports aggregation of a maximum of two carriers.

(f) A duplex capability of the first-type terminal device is different from a duplex capability of the second-type terminal device. Optionally, the duplex capability of the first-type terminal device is weaker than the duplex capability of the second-type terminal device. For example, the second-type terminal device can support full-duplex frequency division duplex (frequency division duplex, FDD), or support both full-duplex FDD and half-duplex FDD, and the first-type terminal device supports only half-duplex FDD.

(g) A data processing time capability of the first-type terminal device is different from a data processing time capability of the second-type terminal device. Optionally, the data processing time capability of the first-type terminal device is weaker than the data processing time capability of the second-type terminal device. In this embodiment of this application, different data processing time capabilities may be represented by using a relationship between minimum latencies for processing data by the two types of terminal devices, a relationship between maximum latencies for processing data by the two types of terminal devices, or a relationship between a minimum latency for processing data by one type of terminal device and a maximum latency for processing data by the other type of terminal device. A latency for processing data may further be represented in at least one of the following manners: a latency between receiving downlink data and sending a hybrid automatic repeat request (hybrid automatic repeat request, HARQ) feedback for the downlink data, a latency between sending uplink data and receiving a HARQ feedback for the uplink data, or a latency between receiving control information and sending uplink data based on the control information. For example, a minimum latency between receiving downlink data by the second-type terminal device and sending a HARQ feedback for the downlink data by the second-type terminal device is less than a minimum latency between receiving downlink data by the first-type terminal device and sending a HARQ feedback for the downlink data by the first-type terminal device; a minimum latency between sending uplink data by the second-type terminal device and receiving a HARQ feedback for the uplink data by the second-type terminal device is less than a minimum latency between sending uplink data by the first-type terminal device and receiving a HARQ feedback for the uplink data by the first-type terminal device; and/or a minimum latency between receiving control information by the second-type terminal device and sending uplink data based on the control information by the second-type terminal device is less than a minimum latency between receiving control information by the first-type terminal device and sending uplink data based on the control information by the first-type terminal device.

(h) A processing capability of the first-type terminal device is different from a processing capability of the second-type terminal device. Optionally, the processing capability of the first-type terminal device is weaker than the processing capability of the second-type terminal device. In this embodiment of this application, the processing capability of the terminal device includes, but is not limited to, at least one of the following: a quantity of HARQ processes supported in uplink data transmission and/or downlink data transmission, a soft buffer (soft buffer) size, highest quadrature amplitude modulation (quadrature amplitude modulation, QAM) supported in uplink data transmission and/or downlink data transmission, and the like.

(i) An uplink data transmission peak rate and/or a downlink data transmission peak rate corresponding to the first-type terminal device are/is different from an uplink data transmission peak rate and/or a downlink data transmission peak rate corresponding to the second-type terminal device. Optionally, the uplink data transmission peak rate and/or the downlink data transmission peak rate corresponding to the first-type terminal device are/is less than the uplink data transmission peak rate and/or the downlink data transmission peak rate corresponding to the second-type terminal device.

For example, in this embodiment of this application, the first-type terminal device may be an NR-light terminal device. The second-type terminal device may be a non-NR-light terminal device or a terminal device having both NR-light and non-NR-light functions (for example, a terminal device of NR release 15 and/or a terminal device of NR release 16), or may be an evolved terminal device in a future wireless communication system, which is not limited to an LTE terminal device or an NR terminal device.

Alternatively, for example, both the first-type terminal device and the second-type terminal device may be NR-light terminal devices, but a capability of the first-type terminal device is weaker than a capability of the second-type terminal device. For comparison between capabilities of the two types of terminal devices, refer to the foregoing descriptions. Details are not described again. For example, a maximum data transmission bandwidth of the second-type terminal device on one carrier may be 20 MHz, and a maximum data transmission bandwidth of the first-type terminal device on one carrier is 10 MHz.

Alternatively, for example, the first-type terminal device may be an NR REDCAP terminal device, and the second-type terminal device may be a non-NR REDCAP terminal device. Based on protocol release division, in this embodiment of this application, the foregoing NR legacy terminal device may be considered as a non-NR REDCAP terminal device, and some terminal devices of NR release 17 and/or a release later than NR release 17 may be considered as NR REDCAP terminal devices, for example, terminal devices each having an NR REDCAP capability, or terminal devices each having both a non-NR REDCAP capability and the NR REDCAP capability.

In this embodiment of this application, when the terminal device corresponding to the common information can include the first-type terminal device and the second-type terminal device, it also means that the first-type terminal device and the second-type terminal device may receive same common information, so that second DCI that is received by the first-type terminal device and that is for scheduling common information transmission is the same as second DCI that is received by the second-type terminal device and that is for scheduling common information transmission. From a perspective of a network device side, in this design, same DCI may be sent to different types of terminal devices to indicate common information transmission, and this may reduce overheads of sending the common information by the network device (where the overheads of the common information include resource overheads corresponding to DCI for scheduling common information transmission, or the overheads of the common information include resource overheads corresponding to DCI for scheduling common information transmission and common information transmission), to reduce power consumption on the network device side.

Optionally, in this embodiment of this application, that the bit quantity of the first DCI is the same as a bit quantity of second DCI may include the following cases:

A sum of bit quantities of all information fields included in the first DCI is the same as a sum of bit quantities of all information fields included in the second DCI.

A bit quantity of original information of the first DCI is the same as a bit quantity of original information of the second DCI, where the bit quantity of the original information in this embodiment of this application is a bit quantity of to-be-transmitted DCI on which a CRC operation has not been performed. The bit quantity of the original information may include a quantity of zero padding bits. In other words, an original information bit may include the zero padding bit. The zero padding bit may be understood as a bit whose value is 0 and that is added to DCI to enable a bit quantity of the DCI to reach a specific value.

A bit quantity of the first DCI on which a channel coding operation has not been performed is the same as a bit quantity of the second DCI on which the channel coding operation has not been performed.

A quantity of modulated symbols corresponding to transmission of the first DCI is the same as a quantity of modulated symbols corresponding to transmission of the second DCI.

A bit quantity corresponding to a modulated symbol that corresponds to transmission of the first DCI and that has been demodulated is the same as a bit quantity corresponding to a modulated symbol that corresponds to transmission of the second DCI and that has been demodulated.

It should be noted that, in this embodiment of this application, that a sum of bit quantities of all information fields included in the first DCI is the same as a sum of bit quantities of all information fields included in the second DCI may be understood as follows: A sum of quantities of valid bits corresponding to all information fields included in the first DCI is the same as a sum of quantities of valid bits corresponding to all information fields included in the second DCI. Alternatively, a sum of quantities of valid bits corresponding to all information fields included in the first DCI is different from a sum of quantities of valid bits corresponding to all information fields included in the second DCI, but zero padding (zero padding) or truncation (truncation) may be used to implement the case in which the sum of bits quantities of all information fields included in the first DCI is the same as the sum of bit quantities of all information fields included in the second DCI. Herein, the quantity of valid bits may be understood as a quantity of bits that are not zero padding bits. For example, after the first DCI is multiplexed by using an information element, a corresponding bit quantity is S1, and after the second DCI is multiplexed by using the information element, a corresponding bit quantity is S2, where S1 is not equal to S2. Assuming that S1 is less than S2, the bit quantity of the first DCI may be adjusted to be equal to the bit quantity of the second DCI by adding zero padding bits. In this case, a quantity of added zero padding bits is S2−S1. If S1 is greater than S2, the bit quantity of the first DCI may be adjusted to be equal to the bit quantity of the second DCI through truncation. In this case, a quantity of bits discarded in the first DCI is S1−S2.

Optionally, in this embodiment of this application, the first identifier in the first DCI may be explicitly or implicitly indicated by using the information field included in the first DCI. For an explicit or implicit indication implementation, refer to the foregoing manner of indicating whether the first DCI is for scheduling uplink or downlink data transmission. Details are not described herein again.

Optionally, in this embodiment of this application, a bit quantity of each information field included in the first DCI in the first DCI format is fixed.

That a bit quantity of each information field included in the first DCI in the first DCI format is fixed may be understood as that information bit quantities of all information fields included in the first DCI in the first DCI format are fixed. For descriptions about that the information bit quantities are fixed, refer to the descriptions of the first point and the third point in which the bit quantity of the first DCI is fixed. Details are not described herein again.

Optionally, in this embodiment of this application, the first DCI in the first DCI format includes one or more of the following information fields:

First information field: The first information field indicates frequency domain resource allocation information. The frequency domain resource allocation information herein refers to a frequency domain resource for data transmission scheduled by using the first DCI, and a bit quantity corresponding to the first information field is fixed.

Second information field: The second information field indicates time domain resource allocation information. The time domain resource allocation information herein refers to a time resource for data transmission scheduled by using the first DCI, and a bit quantity corresponding to the second information field is fixed.

Third information field: The third information field indicates a modulation and coding scheme (modulation and coding scheme, MCS). For example, the third information field indicates a modulation scheme and a target bit rate that are used for data transmission scheduled by using the first DCI. The modulation scheme herein may include, for example, quadrature phase shift keying (quadrature phase shift keying, QPSK), 16 QAM, and 64 QAM. The target bit rate herein may represent a ratio of a first bit quantity to a second bit quantity, where the first bit quantity is a bit quantity corresponding to original information that corresponds to transmitted data and on which channel coding has been performed, and the second bit quantity is a sum of bit quantities corresponding to all modulated symbols corresponding to data transmission. A bit quantity corresponding to the third information field is fixed.

Fourth information field: The fourth information field indicates a redundancy version (redundancy version, RV). The RV herein refers to an RV for data transmission scheduled by using the first DCI. The terminal device may determine, based on an RV indication, a bit of to-be-transmitted information on which channel coding has been performed. A bit quantity corresponding to the fourth information field is fixed.

Fifth information field: The fifth information field indicates a HARQ process number. The HARQ process number herein refers to a HARQ process number corresponding to data transmission scheduled by using the first DCI. The terminal device may distinguish, based on HARQ process numbers, data of different HARQ processes sent by the network device, and when the data is incorrectly received, the terminal device may perform data combination processing on data of a same HARQ process, to improve data receiving reliability. Alternatively, for uplink data transmission, the network device may distinguish, based on HARQ process numbers, data of different HARQ processes sent by the terminal device, and perform data combination processing on data of a same HARQ process. A bit quantity corresponding to the fifth information field is fixed.

Optionally, when the first DCI is for downlink data scheduling, the first DCI in the first DCI format may further include one or more of the following information fields:

Sixth information field: The sixth information field indicates transmit power control (transmit power control, TPC) information for scheduling a physical uplink control channel (physical uplink control channel, PUCCH). When transmitting the PUCCH, the terminal device adjusts, based on the information field, an uplink transmit power for transmitting the PUCCH, to determine the uplink transmit power for transmitting the PUCCH. A bit quantity corresponding to the sixth information field is fixed.

Seventh information field: The seventh information field indicates a PUCCH resource. The terminal device may determine, based on this information field indication, a PUCCH resource for sending uplink control information. The PUCCH resource herein includes but is not limited to: a time-frequency resource corresponding to a PUCCH, and a PUCCH format (PUCCH format) used by the terminal device to feed back HARQ-acknowledgement (acknowledgement, ACK) information on the PUCCH time-frequency resource. The terminal device feeds back, by using the PUCCH resource, whether a HARQ-ACK is transmitted through intra-slot frequency hopping, and the like. A bit quantity corresponding to the seventh information field is fixed. The HARQ-ACK includes an acknowledgment ACK and a negative acknowledgement (negative acknowledgement, NACK).

Eighth information field: The eighth information field indicates a timing relationship between downlink data transmission scheduled by using the first DCI and a HARQ feedback. The HARQ feedback is a feedback made by the terminal device based on whether downlink data sent by the network device is correctly received. If the downlink data is correctly received, an ACK is fed back; otherwise, a NACK is fed back. After receiving a physical downlink shared channel (physical downlink shared channel, PDSCH), the terminal device may determine, based on the information field, a feedback latency of a HARQ feedback corresponding to the PDSCH, to determine a time location of the HARQ feedback. A bit quantity corresponding to the eighth information field is fixed.

Optionally, when the first DCI is for uplink data scheduling, the first DCI in the first DCI format may further include:

- a ninth information field, where the ninth information field indicates TPC information for scheduling a physical uplink shared channel (physical uplink shared channel, PUSCH). When transmitting the PUSCH scheduled by using the first DCI, the terminal device adjusts, based on the information field, an uplink transmit power for transmitting the PUSCH, to determine the uplink transmit power for transmitting the PUSCH. A bit quantity corresponding to the information field is fixed.

Optionally, in this embodiment of this application, an information bit quantity of at least one information field in an information field included in the first DCI in the second DCI format is configurable.

In a possible implementation, the information field included in the second DCI format may be described from the following dimensions:

In one aspect, optionally, the first DCI in the second DCI format includes one or more of the information fields included in the first DCI in the first DCI format. When the first DCI in the first DCI format and the first DCI in the second DCI format include a same information field, information bit quantities corresponding to the information field may be the same or different. For example, both the first DCI in the first DCI format and the first DCI in the second DCI format include the foregoing second information field. In the first DCI in the first DCI format, the second information field may occupy four bits, that is, may indicate a maximum of 16 types of different time resources. In the first DCI in the second DCI format, the second information field may also correspond to four bits, or may correspond to M bits based on the RRC signaling configuration, where M is an integer different from 4. For another example, the first DCI in the first DCI format includes X1 bits for indicating the MCS. In the first DCI in the second DCI format, X1 to X2 bits may indicate the MCS, and X2 bits are used to implement another function of the RRC configuration, for example, configuration information associated with triggering reporting of aperiodic channel state information (channel state information, CSI). This is not specifically limited in this embodiment of this application.

In another aspect, optionally, the first DCI in the second DCI format further includes an information field that is not included in the first DCI in the first DCI format, for example, may include at least one of the following information fields:

Tenth information field: The tenth information field indicates control information related to multi-antenna data transmission, for example, an antenna port indication.

Eleventh information field: The eleventh information field indicates control information related to a code block group (code block group, CBG), for example, code block group transmission information (code block group transmission information, CBGTI) or code block group flushing out information (code block group flushing out information, CBGFI).

Twelfth information field: The twelfth information field indicates beam-related control information, for example, a transmission configuration indication (transmission configuration indication, TCI).

Thirteenth information field: The thirteenth information field indicates carrier-related control information, for example, a downlink assignment index (downlink assignment index, DAI) or an uplink/supplementary uplink (supplementary uplink, SUL) indication.

Fourteenth information field: The fourteenth information field indicates control information related to BWP switching. For example, the network device configures four BWPs for the terminal device, and the fourteenth information field may indicate, by using two bits, a BWP carrying data transmission. Data transmission herein is scheduled by using the first DCI including the fourteenth information field. BWP switching herein may be understood as switching data transmission between the network device and the terminal device from one BWP to another BWP.

In another possible implementation, the information field included in the second DCI format may alternatively be described from the following dimensions:

The first DCI in the second DCI format includes an information field for a first data transmission function and an information field for a second data transmission function. The information field for the first data transmission function may be implemented by using X bits, and the information field for the second data transmission function may be implemented by using Y bits, where a sum of X and Y is not greater than the bit quantity of the first DCI.

In this embodiment of this application, the first data transmission function indicates a basic function for scheduling data transmission, and the second data transmission function indicates an additional function for scheduling data transmission.

Optionally, in this embodiment of this application, the information field for the first data transmission function includes one or more of the following information fields:

the first information field, the second information field, the third information field, the fourth information field, or the fifth information field. For related descriptions of the first information field to the fifth information field, refer to the foregoing embodiment. Details are not described herein again.

Optionally, when the first DCI is for downlink data scheduling, the information field for the first data transmission function further includes one or more of the following information fields:

the sixth information field, the seventh information field, or the eighth information field. For related descriptions of the sixth information field to the eighth information field, refer to the foregoing embodiment. Details are not described herein again.

Optionally, when the first DCI is for uplink data scheduling, the information field for the first data transmission function further includes:

the ninth information field. For related descriptions of the ninth information field, refer to the foregoing embodiment. Details are not described herein again.

Optionally, in this embodiment of this application, the information field for the second data transmission function includes one or more of the following information fields:

the tenth information field, the eleventh information field, the twelfth information field, the thirteenth information field, or the fourteenth information field. For related descriptions of the tenth information field to the fourteenth information field, refer to the foregoing embodiment. Details are not described herein again.

Optionally, in this embodiment of this application, the first DCI in the second DCI format may include aperiodic CSI triggering indication information, and the information indicates the terminal device to report an aperiodic CSI measurement result. In this implementation, the network device may flexibly indicate, to the terminal device based on a data transmission requirement, whether to report the aperiodic CSI measurement result. For example, when a data transmission channel state between the network device and the terminal device changes fast, the network device may indicate, by using the information field in the first DCI in the second DCI format, the terminal device to report the aperiodic CSI measurement result. Alternatively, when a data transmission channel between the network device and the terminal device changes slowly, the network device may determine quality of the data transmission channel between the network device and the terminal device by using CSI periodically reported by the terminal device. In this case, the network device may indicate, by using the information field, the terminal device not to report the aperiodic CSI measurement result. Alternatively, an indication field for distinguishing between the first DCI format and the second DCI format may indicate the terminal device not to report the aperiodic CSI measurement result. In this case, it is considered, by default, that the first DCI in the first DCI format does not support indication of reporting the aperiodic CSI measurement result, that is, the first DCI in the first DCI format does not include the aperiodic CSI triggering indication information. Based on this, the terminal device can flexibly report aperiodic CSI, to ensure data transmission efficiency.

Optionally, in this embodiment of this application, whether the information field for the second data transmission function is valid may be indicated by using a control field in the first DCI in the second DCI format in a bitmap (bitmap) or binary manner, and parameter information corresponding to a valid information field is configured by using RRC signaling. Alternatively, whether the information field for the second data transmission function is valid may be directly implemented through RRC signaling configuration.

In a possible implementation, whether the information field for the second data transmission function is valid may be indicated by using the control field in the first DCI in the second DCI format in the bitmap manner. For example, in the first DCI in the second DCI format, Y1 bits respectively indicate Y1 information fields. If a value of a corresponding bit is 1, it indicates that an information field corresponding to the bit is valid, or the information field corresponding to the bit is enabled. After the information field corresponding to the bit is enabled, parameter information (for example, a parameter configuration or a bit quantity) corresponding to the information field may be implemented through corresponding RRC signaling configuration. For example, two bits indicate that the first DCI in the second DCI format includes an information field 1 and an information field 2, and parameter information respectively corresponding to the information field 1 and the information field 2 is configured with reference to RRC signaling.

In another possible implementation, whether the information field for the second data transmission function is valid may be indicated by using the control field in the first DCI in the second DCI format in the binary manner. For example, Y bits may correspond to $2^Y$ different information fields. An enabled information field may be determined based on a specific value of $2^Y$. After a corresponding information field is enabled, parameter information (for example, a parameter configuration or a bit quantity) corresponding to the information field may be implemented through corresponding RRC signaling configuration. For example, if Y=2, the Y bits may correspond to four information fields. When the Y bits indicate that one of the information fields is valid, for example, indicate that the control information related to multi-antenna data transmission is valid, the terminal device may then determine, with reference to the RRC signaling configuration, specific configuration information corresponding to multi-antenna data transmission, for example, a quantity of DMRS ports, a DMRS port transmission type (for example, a DMRS type 1 or a DMRS type 2), a symbol location occupied during DMRS transmission in terms of time (for example, a DMRS mapping type A or a DMRS mapping type B), or a mapping relationship between transmission at each layer and a DMRS port when the terminal device performs multi-layer transmission. In this embodiment of this application, RRC signaling indicating specific information of a parameter corresponding to an information field may be carried on the PDSCH scheduled by using the first DCI in the first DCI format.

In still another possible implementation, a plurality of information fields included in the first DCI in the second DCI format may share a same bit. When one of the information fields is enabled, the remaining bits may perform further indication on parameter information corresponding to the enabled information field. For example, the first DCI in the second DCI format includes four bits, the second data transmission function occupies four bits, and the enabled information field is indicated in the bitmap form. When only one bit is used to enable one information field for the second data transmission function, for example, enable a configuration related to MIMO data transmission, the other three bits may indicate a maximum of eight different configurations related to MIMO data transmission. For another example, when only two bits are used to enable two different information fields for the second data transmission function, for example, enable a configuration related to MIMO data transmission and a configuration related to CBG data transmission, the other two bits may separately perform further refined indication on RRC configurations corresponding to the two functions. For example, the two bits respectively correspond to the configuration related to MIMO data transmission and the configuration related to CBG data transmission. In other words, a value of one bit in the two bits may indicate two different configurations corresponding to MIMO data transmission, and a value of the other bit in the two bits may indicate two different configurations corresponding to CBG data transmission. Alternatively, a joint RRC configuration of the configuration related to MIMO data transmission and the configuration related to CBG data transmission may be indicated by using two bits. In other words, the two bits may correspond to four states, and each state may indicate the configuration related to MIMO data transmission and/or the configuration related to CBG data transmission.

In this embodiment of this application, for the first DCI in the second DCI format, when a specific configuration parameter of the information field is implemented through RRC configuration, RRC configuration signaling may be carried on the PDSCH scheduled by using the first DCI in the first DCI format. Because the bit quantity of the information field corresponding to the first DCI in the first DCI format is determined, the terminal device may determine, by detecting the first DCI format, scheduling information indicated by the first DCI, and further receive the PDSCH to obtain the RRC configuration signaling. When the terminal device detects the first DCI in the first DCI format, there is no problem of ambiguity in RRC signaling configuration.

In this embodiment of this application, an information bit quantity of at least one information field in the information field included in the first DCI in the second DCI format is configurable. For example, the quantity may be configured by using RRC signaling. Therefore, scheduling flexibility can be improved.

For example, in this embodiment of this application, the first DCI in the first DCI format may correspond to, for example, existing fallback downlink control information (fallback downlink control information, FB DCI), and the first DCI in the second DCI format may correspond to, for example, existing non-fallback downlink control information (non-fallback down control information, non-FB DCI). This is uniformly described herein, and details are not described below again.

Optionally, in this embodiment of this application, the first DCI in the first DCI format and the first DCI in the second DCI format may correspond to a same data transmission direction. For example, both the first DCI in the first DCI format and the first DCI in the second DCI format indicate a downlink data transmission configuration, or both indicate an uplink data transmission configuration.

Optionally, in this embodiment of this application, the first DCI may correspond to different types of NR REDCAP terminal devices. For example, the NR REDCAP terminal devices are classified into low-end, mid-range, and high-end terminal devices. The second data transmission function may vary with different types of NR REDCAP terminal devices. This is not specifically limited in this embodiment of this application.

Optionally, in this embodiment of this application, a control channel for carrying the first DCI may be, for example, a PDCCH, an enhanced PDCCH (enhanced PDCCH, EPDCCH), an MTC PDCCH (MPDCCH), a narrowband PDCCH (narrowband PDCCH, NPDCCH), or another channel that is newly defined in a future communication protocol and whose function is the same as or similar to that of a downlink control channel. A type and a name of the control channel are not specifically limited in this embodiment of this application.

Optionally, in this embodiment of this application, only a DCI format with the bit quantity of the first DCI may be configured in or only the DCI format with the bit quantity of the first DCI may be detected in a user-specific search space (UE-specific search space, USS) corresponding to the terminal device shown in FIG. 4. To be specific, the terminal device detects the first DCI in the USS, where only the DCI format with the bit quantity of the first DCI is configured in the USS; the terminal device detects only the DCI format with the bit quantity of the first DCI in the USS; or in the USS configured by the network device for the terminal device, the network device configures only the DCI format with the bit quantity of the first DCI for the terminal device. It should be noted that, the USS herein is one or more USSs (including all configured USSs) in at least one USS configured by the network device for the terminal device. As described above, there may be one or more DCI formats with the bit quantity of the first DCI. Different DCI formats may be distinguished by using, for example, different RNTIs, or may be indicated by using the control field included in the first DCI. For example, two of the DCI formats may be the first DCI format and the second DCI format. Because only the DCI format with the bit quantity of the first DCI is configured in the USS, the terminal device needs to detect a DCI format of only one DCI size in the USS. Compared with the conventional technology in which the terminal device detects DCI formats of a maximum of two DCI sizes in the USS, in this solution, complexity of detecting DCI by the terminal device may be reduced, and power consumption of the terminal device may be further reduced.

Optionally, in this embodiment of this application, only the DCI format with the bit quantity of the first DCI may be detected in the USS corresponding to the terminal device and a common search space (Common search space, CSS) shown in FIG. 4. In other words, in the USS and the CSS that are configured by the network device for the terminal device, the network device configures only the DCI format with the bit quantity of the first DCI for the terminal device. As described above, the USS herein is one or more USSs (including all configured USSs) in the at least one USS configured by the network device for the terminal device, and the CSS is one or more CSSs (including all configured CSSs) in at least one CSS configured by the network device for the terminal device. As described above, there may be one or more DCI formats with the bit quantity of the first DCI. Different DCI formats may be distinguished by using, for example, different RNTIs, or may be indicated by using the control field included in the first DCI. For example, two of the DCI formats may be the first DCI format and the second DCI format. For the terminal device, when only the DCI format with the bit quantity of first DCI is configured in all configured USSs and all configured CSSs, the terminal device needs to detect a DCI format of only one DCI size at most. Compared with the conventional technology in which the terminal device detects DCI formats of a maximum of four DCI sizes in the CSS and the USS, in this solution, complexity of detecting DCI by the terminal device may be reduced, and power consumption of the terminal device may be further reduced.

The actions of the terminal device or the network device in steps S401 to S403 may be performed by the processor 201 in the communication device 200 shown in FIG. 2 by invoking the application program code stored in the memory 203.

It may be understood that, in the foregoing embodiments, the method and/or step implemented by the terminal device may also be implemented by a module (for example, a chip or a chip system) that can be used in the terminal device, and the method and/or step implemented by the network device may also be implemented by a module (for example, a chip or a chip system) that can be used in the network device.

The foregoing mainly describes the solutions provided in embodiments of this application from a perspective of interaction between network elements. Correspondingly, an embodiment of this application further provides a communication apparatus, and the communication apparatus is configured to implement the foregoing methods. The communication apparatus may be the terminal device in the foregoing method embodiment or a module (for example, a chip or a chip system) used in the terminal device. Alternatively, the communication apparatus may be the network device in the foregoing method embodiment or a module (for example, a chip or a chip system) used in the network device. It may be understood that, to implement the foregoing functions, the communication apparatus includes a hardware structure and/or a software module for performing a corresponding function. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

Figure 5:
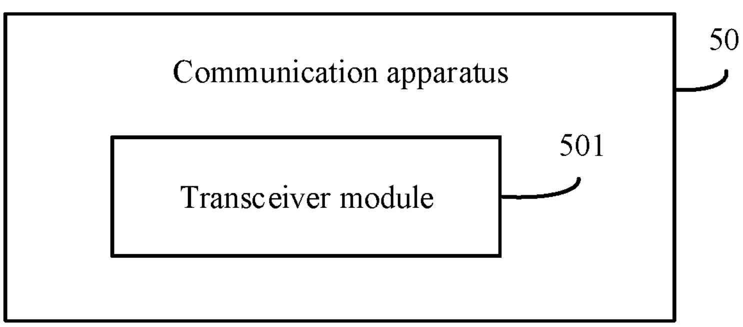
FIG. 5 is a schematic diagram of a structure of a communication apparatus according to an embodiment of this application.

FIG. 5 is a schematic diagram of a structure of a possible communication apparatus 50 according to an embodiment of this application. The communication apparatus 50 may be the terminal device 30 shown in FIG. 1, or may be a module (for example, a chip or a chip system) used in the terminal device 30. As shown in FIG. 5, the communication apparatus 50 includes a transceiver module 501. The transceiver module 501 may also be referred to as a transceiver unit, and is configured to implement a transceiver function. For example, the transceiver module 501 may be a transceiver circuit, a transceiver machine, a transceiver, or a communication interface.

Optionally, in this embodiment of this application, when the communication apparatus 50 is the terminal device, the transceiver module 501 may be a sending module or a transmitter when sending information, and the transceiver module 501 may be a receiving module or a receiver when receiving information. The transceiver, the transmitter, or the receiver may be a radio frequency circuit. This is not specifically limited in this embodiment of this application.

Optionally, in this embodiment of this application, when the communication apparatus 50 is the module (for example, the chip or the chip system) used in the terminal device 30, the transceiver module 501 may be an input and/or output interface, a pin, a circuit, or the like.

The transceiver module 501 is configured to receive first DCI from a network device, where the first DCI is for uplink or downlink data scheduling, a bit quantity of the first DCI is fixed, the first DCI includes a first identifier, the first identifier indicates a format of the first DCI, and the format of the first DCI includes a first DCI format or a second DCI format. The transceiver module 501 is further configured to receive downlink data from the network device or send uplink data to the network device based on the first DCI.

Optionally, an information bit quantity of at least one information field in an information field included in the first DCI in the second DCI format is configurable.

Optionally, a bit quantity of each information field included in the first DCI in the first DCI format is fixed.

Optionally, that a bit quantity of the first DCI is fixed includes: a bit quantity of each information field included in the first DCI is fixed; the first DCI includes an information field associated with an RRC signaling configuration, but a bit quantity corresponding to the first DCI is fixed; or a bit quantity corresponding to the first DCI is related to an initial access parameter.

Optionally, the bit quantity of the first DCI is the same as a bit quantity of second DCI, and the second DCI is for scheduling common information transmission.

Optionally, a communication apparatus corresponding to common information is a first-type communication apparatus, or the communication apparatus corresponding to the common information includes the first-type communication apparatus and a second-type communication apparatus, where a capability of the first-type communication apparatus is different from a capability of the second-type communication apparatus.

Optionally, when the common information is system information, the second DCI includes control information for scheduling a system information block type 1 or other system information, and the second DCI is scrambled by an SI-RNTI.

Optionally, the common information is a paging message, and the second DCI is scrambled by a P-RNTI.

Optionally, the common information is RAR information, and the second DCI is scrambled by an RA-RNTI.

Optionally, that the bit quantity of the first DCI is the same as a bit quantity of second DCI includes: a sum of bit quantities of all information fields included in the first DCI is the same as a sum of bit quantities of all information fields included in the second DCI; a bit quantity of original information of the first DCI is the same as a bit quantity of original information of the second DCI, where the bit quantity of the original information is a bit quantity of to-be-transmitted DCI on which a CRC operation has not been performed; a bit quantity of the first DCI on which a channel coding operation has not been performed is the same as a bit quantity of the second DCI on which the channel coding operation has not been performed; a quantity of modulated symbols corresponding to transmission of the first DCI is the same as a quantity of modulated symbols corresponding to transmission of the second DCI; or a bit quantity corresponding to a modulated symbol that corresponds to transmission of the first DCI and that has been demodulated is the same as a bit quantity corresponding to a modulated symbol that corresponds to transmission of the second DCI and that has been demodulated.

Optionally, the first DCI in the second DCI format includes an information field for a first data transmission function and an information field for a second data transmission function, where the first data transmission function indicates a basic function for scheduling data transmission, and the second data transmission function indicates an additional function for scheduling data transmission.

Optionally, whether the information field for the second data transmission function is valid is indicated by using a control field in the first DCI in the second DCI format in a bitmap or binary manner, where parameter information corresponding to a valid information field is configured by using RRC signaling.

Optionally, only a DCI format with the bit quantity of the first DCI is configured in a USS corresponding to the communication apparatus 50.

For more detailed descriptions of the transceiver module 501, directly refer to related descriptions in the method embodiment shown in FIG. 4. Details are not described herein again.

In this embodiment, the communication apparatus 50 is presented in a form of functional modules obtained through division in an integrated manner. The "module" herein may be a specific ASIC, a circuit, a processor that executes one or more software or firmware programs and a memory, an integrated logic circuit, and/or another component that can provide the foregoing functions. In a simple embodiment, when the communication apparatus 50 is configured to implement the function of the terminal device in the method embodiment shown in FIG. 4, a person skilled in the art may figure out that the communication apparatus 50 may be in a form of the communication device 200 shown in FIG. 2.

For example, the processor 201 in the communication device 200 shown in FIG. 2 may invoke the computer-executable instructions stored in the memory 203, so that the communication device 200 performs the communication method in the foregoing method embodiment.

Specifically, the function/implementation process of the transceiver module 501 in FIG. 5 may be implemented by the processor 201 in the communication device 200 shown in FIG. 2 by invoking the computer-executable instructions stored in the memory 203. Alternatively, the function/implementation process of the transceiver module 501 in FIG. 5 may be implemented by the communication interface 204 in the communication device 200 shown in FIG. 2.

Optionally, in this embodiment of this application, when the communication apparatus 50 is the module (for example, the chip or the chip system) used in the terminal device, the memory 203 may be a storage unit in the chip or the chip system, for example, a register or a cache, or may be a storage unit that is located outside the chip or the chip system and that is in the terminal device, for example, a ROM, another type of static storage device that can store static information and instructions, or a RAM. This is not specifically limited in this embodiment of this application.

Optionally, in this embodiment of this application, when the communication apparatus 50 is the chip system used in the terminal device, the communication apparatus 50 may include a chip, or may include a chip and another discrete component. This is not specifically limited in this embodiment of this application.

The communication apparatus 50 provided in this embodiment can perform the communication method provided in the embodiment shown in FIG. 4. Therefore, for technical effects that can be achieved by the communication apparatus 50, refer to the embodiment shown in FIG. 4. Details are not described herein again.

Figure 6:
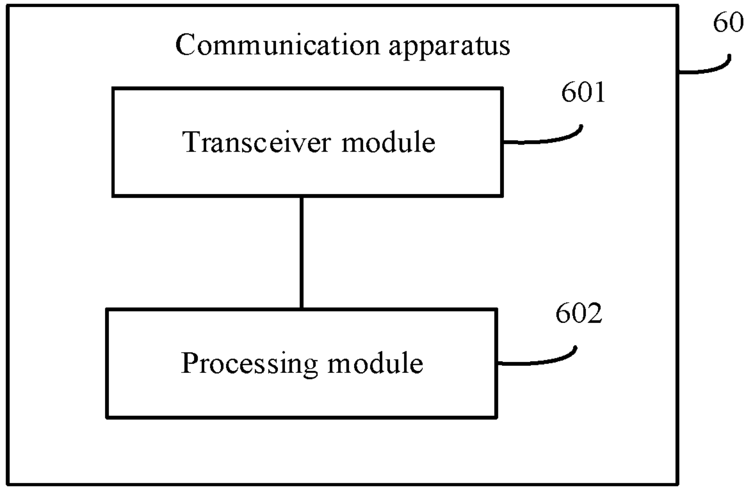
FIG. 6 is a schematic diagram of a structure of another communication apparatus according to an embodiment of this application.

FIG. 6 is a schematic diagram of a structure of another possible communication apparatus 60 according to an embodiment of this application. The communication apparatus 60 may be the network device 20 shown in FIG. 1, or may be a module (for example, a chip) used in the network device 20. As shown in FIG. 6, the communication apparatus 60 includes a transceiver module 601 and a processing module 602. The transceiver module 601 may also be referred to as a transceiver unit, and is configured to implement a transceiver function. For example, the transceiver module 601 may be a transceiver circuit, a transceiver machine, a transceiver, or a communication interface.

Optionally, in this embodiment of this application, when the communication apparatus 60 is the network device, the transceiver module 601 may be a sending module or a transmitter when sending information, and the transceiver module 601 may be a receiving module or a receiver when receiving information. The transceiver, the transmitter, or the receiver may be a radio frequency circuit. This is not specifically limited in this embodiment of this application.

Optionally, in this embodiment of this application, when the communication apparatus 60 is the module (for example, the chip or a chip system) used in the network device, the transceiver module 601 may be an input and/or output interface, a pin, a circuit, or the like.

The processing module 602 is configured to determine first DCI, where the first DCI is for uplink or downlink data scheduling, a bit quantity of the first DCI is fixed, the first DCI includes a first identifier, the first identifier indicates a format of the first DCI, and the format of the first DCI includes a first DCI format or a second DCI format; and the transceiver module 601 is configured to send the first DCI to a terminal device.

Optionally, an information bit quantity of at least one information field in an information field included in the first DCI in the second DCI format is configurable.

Optionally, that a bit quantity of the first DCI is fixed includes: a bit quantity of each information field included in the first DCI is fixed; the first DCI includes an information field associated with an RRC signaling configuration, but a bit quantity corresponding to the first DCI is fixed; or a bit quantity corresponding to the first DCI is related to an initial access parameter.

Optionally, the bit quantity of the first DCI is the same as a bit quantity of second DCI, and the second DCI is for scheduling common information transmission.

Optionally, a terminal device corresponding to common information is a first-type terminal device, or the terminal device corresponding to the common information includes the first-type terminal device and a second-type terminal device, where a capability of the first-type terminal device is different from a capability of the second-type terminal device.

Optionally, when the common information is system information, the second DCI includes control information for scheduling a system information block type 1 or other system information, and the second DCI is scrambled by an SI-RNTI.

Optionally, the common information is a paging message, and the second DCI is scrambled by a P-RNTI.

Optionally, the common information is RAR information, and the second DCI is scrambled by an RA-RNTI.

Optionally, that the bit quantity of the first DCI is the same as a bit quantity of second DCI includes: a sum of bit quantities of all information fields included in the first DCI is the same as a sum of bit quantities of all information fields included in the second DCI; a bit quantity of original information of the first DCI is the same as a bit quantity of original information of the second DCI, where the bit quantity of the original information is a bit quantity of to-be-transmitted DCI on which a CRC operation has not been performed; a bit quantity of the first DCI on which a channel coding operation has not been performed is the same as a bit quantity of the second DCI on which the channel coding operation has not been performed; a quantity of modulated symbols corresponding to transmission of the first DCI is the same as a quantity of modulated symbols corresponding to transmission of the second DCI; or a bit quantity corresponding to a modulated symbol that corresponds to transmission of the first DCI and that has been demodulated is the same as a bit quantity corresponding to a modulated symbol that corresponds to transmission of the second DCI and that has been demodulated.

Optionally, the first DCI in the second DCI format includes an information field for a first data transmission function and an information field for a second data transmission function, where the first data transmission function indicates a basic function for scheduling data transmission, and the second data transmission function indicates an additional function for scheduling data transmission.

Optionally, whether the information field for the second data transmission function is valid is indicated by using a control field in the first DCI in the second DCI format in a bitmap or binary manner, where parameter information corresponding to a valid information field is configured by using RRC signaling.

Optionally, only a DCI format with the bit quantity of the first DCI is configured in a USS corresponding to the terminal device.

For more detailed descriptions of the transceiver module 601 and the processing module 602, directly refer to related descriptions in the method embodiment shown in FIG. 4. Details are not described herein again.

In this embodiment, the communication apparatus 60 is presented in a form of functional modules obtained through division in an integrated manner. The "module" herein may be a specific ASIC, a circuit, a processor that executes one or more software or firmware programs and a memory, an integrated logic circuit, and/or another component that can provide the foregoing functions. In a simple embodiment, when the communication apparatus 60 is configured to implement the function of the network device in the method embodiment shown in FIG. 4, a person skilled in the art may figure out that the communication apparatus 60 may be in a form of the communication device 200 such as the one illustrated in FIG. 2.

For example, the processor 201 in the communication device 200 shown in FIG. 2 may invoke the computer-executable instructions stored in the memory 203, so that the communication device 200 performs the communication method in the foregoing method embodiment.

Specifically, the functions/implementation processes of the transceiver module 601 and the processing module 602 in FIG. 6 may be implemented by the processor 201 in the communication device 200 shown in FIG. 2 by invoking the computer-executable instructions stored in the memory 203. Alternatively, the function/implementation process of the processing module 602 in FIG. 6 may be implemented by the processor 201 in the communication device 200 shown in FIG. 2 by invoking the computer-executable instructions stored in the memory 203, and the function/implementation process of the transceiver module 601 in FIG. 6 may be implemented by the communication interface 204 in the communication device 200 shown in FIG. 2.

Optionally, in this embodiment of this application, when the communication apparatus 60 is the module (for example, the chip or the chip system) used in the network device, the memory 203 may be the chip, or a storage unit in the chip or the chip system, for example, a register or a cache, or may be a storage unit that is located outside the chip or the chip system and that is in the network device, for example, a ROM, another type of static storage device that can store static information and instructions, or a RAM. This is not specifically limited in this embodiment of this application.

Optionally, in this embodiment of this application, when the communication apparatus 60 is the chip system used in the network device, the communication apparatus 60 may include a chip, or may include a chip and another discrete component. This is not specifically limited in this embodiment of this application.

The communication apparatus 60 provided in this embodiment can perform the communication method provided in the embodiment shown in FIG. 4. Therefore, for technical effects that can be achieved by the communication apparatus 60, refer to the embodiment shown in FIG. 4. Details are not described herein again.

It should be noted that one or more of the foregoing modules or units may be implemented by using software, hardware, or a combination thereof. When any one of the foregoing modules or units is implemented by software, the software exists in a form of a computer program instruction, and is stored in the memory. The processor may be configured to execute the program instruction and implement the foregoing method procedure. The processor may be built into a SoC (system-on-a-chip) or an ASIC, or may be an independent semiconductor chip. In addition to a core for executing software instructions to perform operations or processing, the processor may further include a necessary hardware accelerator, for example, a field programmable gate array (field programmable gate array, FPGA), a PLD (programmable logic device), or a logic circuit that implements a dedicated logic operation.

When the foregoing modules or units are implemented by hardware, the hardware may be any one or any combination of a CPU, a microprocessor, a digital signal processing (digital signal processing, DSP) chip, a microcontroller unit (microcontroller unit, MCU), an artificial intelligence processor, an ASIC, a SoC, an FPGA, a PLD, a dedicated digital circuit, a hardware accelerator, or a non-integrated discrete device, and the hardware may run necessary software or does not depend on software to perform the foregoing method procedure.

All or some of the foregoing embodiments may be implemented by software, hardware, firmware, or any combination thereof. When a software program is used to implement embodiments, embodiments may be implemented completely or partially in a form of a computer program product. The computer program product includes one or more computer instructions. When the computer program instructions are loaded and executed on the computer, the procedure or functions according to embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (solid-state drive, SSD)), or the like.

In embodiments of this application, unless otherwise stated or there is a logic conflict, terms and/or descriptions between different embodiments are consistent and may be mutually referenced, and technical features in different embodiments may be combined based on an internal logical relationship thereof, to form a new embodiment.

In this application, the term "at least one" means one or more, and the term "a plurality of" means two or more. The term "and/or" describes an association relationship for describing associated objects and represents that three relationships may exist. For example, A and/or B may represent the following cases: Only A exists, both A and B exist, and only B exists, where A and B may be singular or plural. In the text descriptions of this application, the character "/" generally indicates an "or" relationship between the associated objects. In a formula in this application, the character "/" indicates a "division" relationship between the associated objects.

It may be understood that numerical symbols in embodiments of this application are differentiated merely for ease of description, but are not used to limit the scope of embodiments of this application. Sequence numbers of the foregoing processes do not mean execution sequences. The execution sequences of the processes should be determined according to functions and internal logic of the processes. In addition, in embodiments of this application, words such as "first" and "second" are used to distinguish between same items or similar items having basically same functions and effects. A person skilled in the art may understand that the terms such as "first" and "second" do not constitute a limitation on a quantity or an execution sequence, and that the terms such as "first" and "second" do not indicate a definite difference.

It should be noted that, in embodiments of this application, the term such as "example" or "for example" is used to represent giving an example, an illustration, or descriptions. Any embodiment or design scheme described as an "example" or "for example" in embodiments in this application should not be explained as being more preferable or having more advantages than another embodiment or design scheme. Exactly, use of the word such as "example" or "for example" is intended to present a relative concept in a specific manner for ease of understanding.

Although this application is described with reference to embodiments, in a process of implementing this application that claims protection, a person skilled in the art may understand and implement another variation of the disclosed embodiments by viewing the appended drawings, disclosed content, and the appended claims. In the claims, "comprising" (comprising) does not exclude another component or another step, and "a" or "one" does not exclude a case of multiple. A single processor or another unit may implement several functions enumerated in the claims. Some measures are recorded in dependent claims that are different from each other, but this does not mean that these measures cannot be combined to produce a better effect.

Although this application is described with reference to specific features and embodiments thereof, it is clear that various modifications and combinations may be made to them without departing from the spirit and scope of this application. Correspondingly, the specification and accompanying drawings are merely example descriptions of this application defined by the appended claims, and are considered as any of or all modifications, variations, combinations or equivalents that cover the scope of this application. It is clear that, a person skilled in the art can make various modifications and variations to this application without departing from the spirit and scope of this application. This application is intended to cover the modifications and variations of this application provided that they fall within the scope of the following claims and equivalent technologies of this application.

What is claimed is:

1. A communication method comprising:

receiving, by a terminal device from a network device, a first downlink control information (DCI) and a second DCI, wherein the first DCI comprises a first identifier that is set to one of different values indicating different formats, the different formats include a first DCI format and a second DCI format, and the first DCI in the first DCI format and the first DCI in the second DCI format are of a same bit quantity, wherein the second DCI is for scheduling common information transmission corresponding to a first-type terminal device and a second-type terminal device, and the first-type terminal device and the second-type terminal device have same common information and different capabilities;

determining, by the terminal device, that the first DCI is the first DCI in the second DCI format, wherein the first DCI in the second DCI format comprises a first information field for first data transmission function, a second information field for second data transmission function and a control field, wherein the first data transmission function indicates a basic function for scheduling data transmission, the second data transmission function indicates an additional function for scheduling data transmission, the control field indicates whether the second information field for the second data transmission function is valid, and the second information field comprises at least one of: an information field for multiple-input and multiple-output (MIMO) data transmission, an information field for code block group (CBG), or an information field for multi-antenna data transmission; and in response to determining that the first DCI is the first DCI in the second DCI format and the control field indicates the second information field is valid, receiving, by the terminal device, downlink data from the network device or sending, by the terminal device, uplink data to the network device based on the first information field and the second information field included in the first DCI in the second DCI format.

2. The method according to claim 1, wherein an information bit quantity of at least one information field included in the first DCI in the second DCI format is configurable, and a bit quantity of each information field included in the first DCI in the first DCI format is fixed.

3. The method according to claim 1, wherein the different capabilities of the first-type terminal device and the second-type terminal device are different bandwidth capabilities.

4. The method according to claim 3, wherein the same common information comprises a paging message or a random access response (RAR) information.

5. The method according to claim 1, wherein the first-type terminal device supports 2 receive antennas and 1 transmit antenna, or 1 receive antenna and 1 transmit antenna; and the second-type terminal device supports 4 receive antenna and 2 transmit antenna.

6. A communication method, comprising:

determining, by a network device, a first downlink control information (DCI), wherein the first DCI is for data scheduling, the first DCI comprises a first identifier that is set to one of different values indicting different DCI formats, the different DCI formats include a first DCI format and a second DCI format, and the first DCI in the first DCI format and the first DCI in the second DCI format are of a same bit quantity, wherein the second DCI is used to schedule common information transmission corresponding to a first-type terminal device and a second-type terminal device, and the first-type terminal device and the second-type terminal device have same common information and different capabilities; and sending the first DCI to a terminal device, wherein when the identifier indicates the second DCI format, the first DCI in the second DCI format comprises a first information field for first data transmission function, a second information field for second data transmission function and a control field, the first data transmission function indicates a basic function for scheduling data transmission, the second data transmission function indicates an additional function for scheduling data transmission, wherein the control field indicates whether the second information field for the second data transmission function is valid, and the second information field comprises at least one of: an information field for multiple-input and multiple-output (MIMO) data transmission, an information field for code block group (CBG), or an information field for multi-antenna data transmission.

7. The method according to claim 6, wherein an information bit quantity of at least one information field included in the first DCI in the second DCI format is configurable, and a bit quantity of each information field included in the first DCI in the first DCI format is fixed.

8. The method according to claim 6, wherein the different capabilities of the first-type terminal device and the second-type terminal device are different bandwidth capabilities.

9. The method according to claim 8, wherein the same common information comprises a paging message or a random access response (RAR) information.

10. The method according to claim 6, wherein the first-type terminal device supports 2 receive antennas and 1 transmit antenna, or 1 receive antenna and 1 transmit antenna; and the second-type terminal device supports 4 receive antenna and 2 transmit antenna.

11. A communication apparatus, comprising:

one or more processors, and a storage medium configure to store program instructions;

wherein, when executed by the one or more processors, the instructions cause the apparatus to:

receive first downlink control information (DCI) and second DCI from a network device, wherein the first DCI is for uplink or downlink data scheduling, a bit quantity of the first DCI is fixed, the first DCI comprises a first identifier that is set to one of different values indicting different DCI formats, the different DCI formats include a first DCI format and a second DCI format, and the first DCI in the first DCI format and the first DCI in the second DCI format are of a same bit quantity, wherein the second DCI is for scheduling common information transmission corresponding to a first-type terminal device and a second-type terminal device, the first-type terminal device and the second-type terminal device have same common information and different capabilities;

determine that the first DCI is the first DCI in the second DCI format, wherein the first DCI in the second DCI format comprises a first information field for first data transmission function, a second information field for second data transmission function and a control field, wherein the first data transmission function indicates a basic function for scheduling data transmission, the second data transmission function indicates an additional function for scheduling data transmission, the control field indicates whether the second information field for the second data transmission function is valid, and the second information field comprises at least one of: an information field for multiple-input and multiple-output (MIMO) data transmission, an information field for code block group (CBG), or an information field for multi-antenna data transmission; and in response to determining that the first DCI is the first DCI in the second DCI format and the control field indicates the second information field is valid, receive downlink data from the network device or send uplink data to the network device based on the first information field and the second information field included in the first DCI in the second DCI format.

12. The communication apparatus according to claim 11, wherein an information bit quantity of at least one information field included in the first DCI in the second DCI format is configurable, and a bit quantity of each information field included in the first DCI in the first DCI format is fixed.

13. The communication apparatus according to claim 11, wherein the different capabilities of the first-type terminal device and the second-type terminal device are different bandwidth capabilities.

14. The communication apparatus according to claim 13, wherein the same common information comprises a paging message or a random access response (RAR) information.

15. The communication apparatus according to claim 11, wherein the first-type terminal device supports 2 receive antennas and 1 transmit antenna, or 1 receive antenna and 1 transmit antenna; and the second-type terminal device supports 4 receive antenna and 2 transmit antenna.

16. A communication apparatus, comprising:

a processing module configured to determine a first downlink control information (DCI) and a second DCI, wherein the first DCI is for uplink or downlink data scheduling, the first DCI comprises a first identifier that is set to one of different values indicating different formats, the different formats include a first DCI format and a second DCI format, and the first DCI in the first DCI format and the first DCI in the second DCI format are of a same bit quantity, wherein the second DCI is for scheduling common information transmission corresponding a first-type terminal device and a second-type terminal device, and the first-type terminal device and the second-type terminal device have same common information and different capabilities; and a transceiver module is configured to send the first DCI and the second DCI to a terminal device, wherein when the identifier indicates the second DCI format, the first DCI in the second DCI format comprises a first information field for first data transmission function, a second information field for second data transmission function and a control field, the first data transmission function indicates a basic function for scheduling data transmission, the second data transmission function indicates an additional function for scheduling data transmission, wherein the control field indicates whether the second information field for the second data transmission function is valid, and the second information field comprises at least one of: an information field for multiple-input and multiple-output (MIMO) data transmission, an information field for code block group CBG), or an information field for multi-antenna data transmission.

17. The communication apparatus according to claim 16, wherein an information bit quantity of at least one information field included in the first DCI in the second DCI format is configurable, and a bit quantity of each information field included in the first DCI in the first DCI format is fixed.

18. The communication apparatus according to claim 16, wherein the different capabilities of the first-type terminal device and the second-type terminal device are different bandwidth capabilities.

19. The communication apparatus according to claim 18, wherein the same common information comprises a paging message or a random access response (RAR) information.

20. The communication apparatus according to claim 16, wherein the first-type terminal device supports 2 receive antennas and 1 transmit antenna, or 1 receive antenna and 1 transmit antenna; and the second-type terminal device supports 4 receive antenna and 2 transmit antenna.

* * * * *